United States Patent
Blot-Lefevre

(10) Patent No.: US 9,444,645 B2
(45) Date of Patent: Sep. 13, 2016

(54) METHOD AND DEVICE FOR ASSESSING A PROBATIVE VALUE OF ELECTRONIC DOCUMENT MANAGEMENT SYSTEMS

(75) Inventor: Eric Blot-Lefevre, Neuilly sur Seine (FR)

(73) Assignee: TrustSeed SAS, Galluis (FR)

( * ) Notice: Subject to any disclaimer, the term of this patent is extended or adjusted under 35 U.S.C. 154(b) by 331 days.

(21) Appl. No.: 12/988,618

(22) PCT Filed: Apr. 21, 2009

(86) PCT No.: PCT/EP2009/054688
§ 371 (c)(1),
(2), (4) Date: Jan. 3, 2011

(87) PCT Pub. No.: WO2009/130190
PCT Pub. Date: Oct. 29, 2009

(65) Prior Publication Data
US 2011/0107408 A1    May 5, 2011

(30) Foreign Application Priority Data

Apr. 22, 2008    (FR) ..................................... 08 02239

(51) Int. Cl.
*H04L 9/32*    (2006.01)
*H04L 12/58*    (2006.01)
(Continued)

(52) U.S. Cl.
CPC ............... *H04L 12/58* (2013.01); *G06F 21/46* (2013.01); *G06F 21/6209* (2013.01);
(Continued)

(58) Field of Classification Search
CPC ....... H04L 63/08; H04L 63/12; H04L 9/321; H04L 9/3247; H04L 12/58; H04L 63/123; H04L 63/126; G06Q 10/10; G06F 21/46; G06F 21/6209

USPC ................................ 726/7, 22; 713/168, 176
See application file for complete search history.

(56) References Cited

U.S. PATENT DOCUMENTS

2001/0027523 A1* 10/2001 Wakino ......................... 713/200
2002/0091782 A1* 7/2002 Benninghoff, III ........... 709/206
(Continued)

FOREIGN PATENT DOCUMENTS

FR    2 900 010    10/2007
FR    2 900 011    10/2007

OTHER PUBLICATIONS

S.C. Wong, S. Miles, W. Fang, P. Groth, L. Moreau; Provenance-based validation of e-science experiments; Proceedings of the 4th International Semantic Web Conference, vol. 3729 of Lecture Notes in Computer Science, pp. 801-815 (2005).*
(Continued)

*Primary Examiner* — Theodore C Parsons
(74) *Attorney, Agent, or Firm* — Stroock & Stroock & Lavan LLP

(57) ABSTRACT

A method for securing data assessing a probative value of document transfers. The identity of a recipient of a document is authenticated. The document is transmitted from a document sender to the recipient by processing the document processing. A probative value of the processing step is measured. The probative values of processing of the transmission are aggregated to provide a measure of the overall probative value of said document transmission. The overall probative value is associated with the transmission of the document. Also provided is a trusted third party network system for managing secure electronic correspondence which includes at least one application computer server handling a directory service for users of the system and a service for supplying the users with current correspondence accounts on the computer server.

10 Claims, 8 Drawing Sheets

Figure 1:
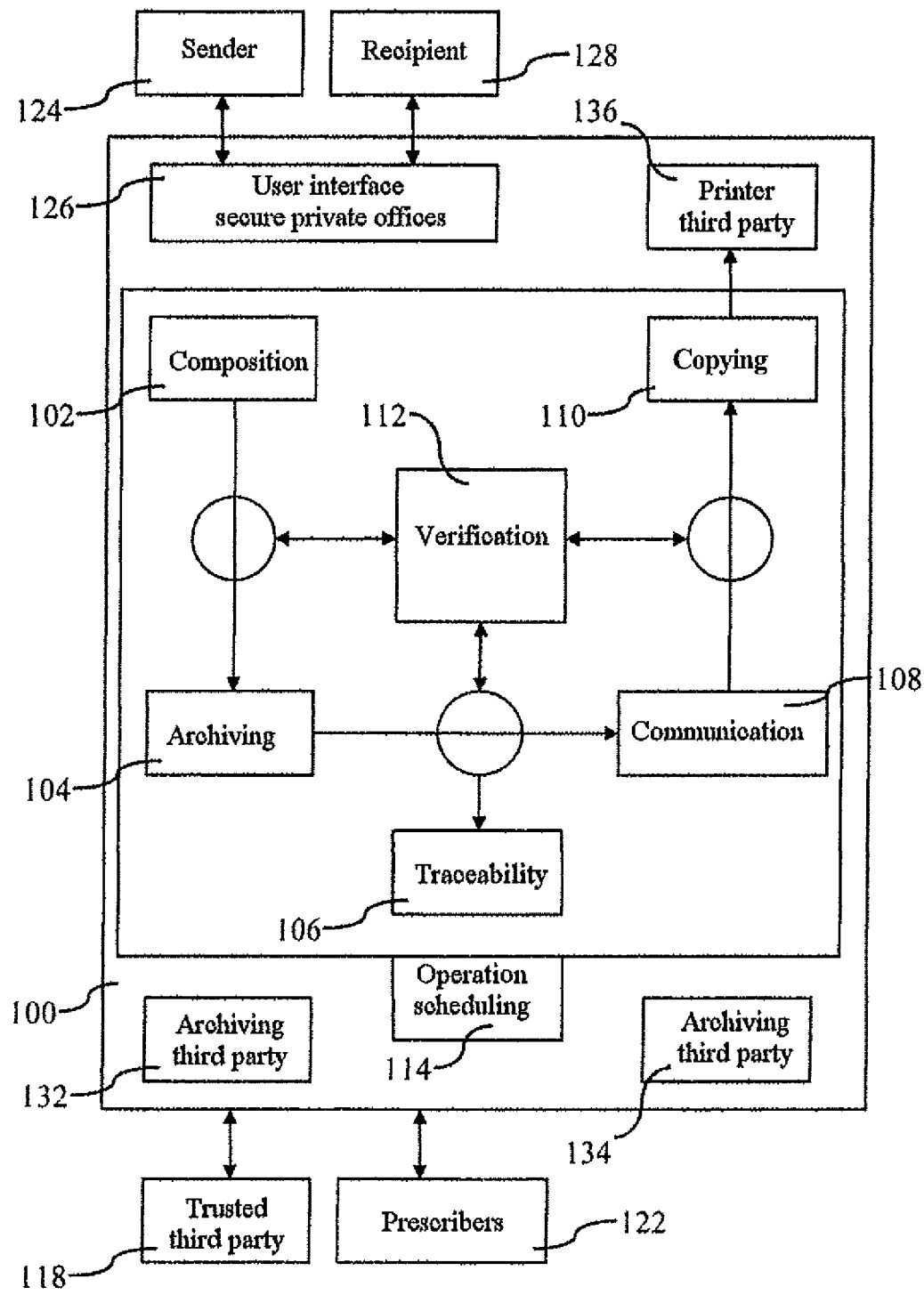

(51) Int. Cl.
*H04L 29/06* (2006.01)
*G06F 21/46* (2013.01)
*G06F 21/62* (2013.01)
*G06Q 10/10* (2012.01)
*G06F 21/00* (2013.01)

(52) U.S. Cl.
CPC ............ *G06Q 10/10* (2013.01); *H04L 9/321* (2013.01); *H04L 9/3247* (2013.01); *H04L 63/08* (2013.01); *H04L 63/12* (2013.01); *H04L 63/123* (2013.01); *H04L 63/126* (2013.01)

(56) References Cited

U.S. PATENT DOCUMENTS

| | | | |
|---|---|---|---|
| 2002/0104026 A1* | 8/2002 | Barra et al. | 713/202 |
| 2002/0144154 A1* | 10/2002 | Tomkow | 713/201 |
| 2003/0030680 A1* | 2/2003 | Cofta et al. | 709/229 |
| 2004/0196978 A1* | 10/2004 | Godfrey et al. | 380/270 |
| 2004/0205124 A1* | 10/2004 | Limprecht et al. | 709/204 |
| 2006/0143462 A1* | 6/2006 | Jacobs | 713/181 |
| 2006/0253447 A1* | 11/2006 | Judge | 707/9 |
| 2007/0086592 A1* | 4/2007 | Ellison et al. | 380/282 |
| 2007/0118484 A1* | 5/2007 | Borenstein et al. | 705/75 |
| 2007/0143407 A1* | 6/2007 | Avritch et al. | 709/206 |
| 2008/0263637 A1* | 10/2008 | Nonaka et al. | 726/4 |
| 2009/0025090 A1* | 1/2009 | Clement et al. | 726/28 |
| 2009/0106557 A1* | 4/2009 | Leonard | 713/179 |
| 2009/0133038 A1* | 5/2009 | Chkodrov et al. | 719/314 |
| 2010/0100465 A1* | 4/2010 | Cooke et al. | 705/34 |
| 2010/0217979 A1* | 8/2010 | Yaghmour | 713/168 |
| 2010/0251367 A1* | 9/2010 | Dill et al. | 726/22 |
| 2010/0251374 A1* | 9/2010 | Dill | H04L 12/58 726/25 |
| 2013/0297477 A1* | 11/2013 | Overman | G06Q 40/00 705/37 |

OTHER PUBLICATIONS

International Search Report and Written Opinion issued in corresponding International Application No. PCT/EP2009/054688.

* cited by examiner

METHOD AND DEVICE FOR ASSESSING A PROBATIVE VALUE OF ELECTRONIC DOCUMENT MANAGEMENT SYSTEMS

BACKGROUND OF THE INVENTION

The present invention relates to a method and a device for securing data transfers. It applies, in particular, to the transmission of mail, bills, legal or accounting documents.

Hybrid, electronic and postal, methods are known, which comprise a step for the sending of an electronic mail with the provision of a postal address of the recipient, the postal organization printing this mail and routing its printed version via traditional postal means, with delivery by hand and signing, by the recipient, of a receipt notification.

Also known are so-called secure electronic mail transmission methods which implement, at both sender and recipient levels, an electronic signature, for example an electronic signature conforming to the public key infrastructure PKI (Public Key Infrastructure).

These methods and devices do not allow assessment of the quality of
- the probative value of the identity of the correspondents;
- the probative value of the legal signature,
- the probative value of the content with required mentions,
- the probative value of the true and lasting archiving,
- the probative value of the integrity and of the reception of the transmissions,
- the probative value of the reads by computer,
- the guarantee of security of the personal trust attributes,
- the guarantee of confidentiality/of the secrecy of the correspondence objects and/or
- the guarantee of interoperability between the service providers: composition/archiving/transfer.

Also known is the document FR 06 04107 which describes a method for securing data transfers which implements a value assessment of at least one attribute of transmission of a document according to at least one of the following elements: a means of identifying the recipient, a possible correspondence anomaly and an element supplied by the recipient during a step for registration with an electronic document transmission service.

This method therefore does not make it possible to assess the quality of:
- the probative value of the legal signature,
- the probative value of the content and of required mentions,
- the probative value of the true and lasting archiving,
- the probative value of the integrity and of the reception of the transmissions,
- the probative value of the reads by computer,
- the guarantee of security of the personal trust attributes,
- the guarantee of confidentiality/secrecy of the correspondence objects, and/or
- the guarantee of interoperability between the service providers: composition/archiving/transfer.

SUMMARY OF THE INVENTION

The present invention aims to remedy these drawbacks.

According to a first aspect, the present invention aims at a method for securing data transfers, comprising:
- a step of checking the identity of at least one recipient to whom a sender of a document wants to transmit said document,
- a step of transmission, over a computer network, by the sender to at least one of the recipients whose identity has been checked, of said document by implementing at least one step of processing of said document by document processing means,
- a step of transmission, over a computer network, by the sender to at least one of the recipients whose identity has been checked, of said document by implementing at least one step of processing of said document by document processing means,
- for at least one said document processing step performed by the document processing means after the step of checking the identity of at least one recipient, a step of measuring a probative value of said processing step according to the document processing means implemented,
- a step of aggregating the probative values of the steps of processing said transmission to provide a measurement of an overall probative value of said transmission of the document, and
- a step of associating, in memory, said overall probative value with an identifier of said transmission of said document.

By virtue of these arrangements, it is possible to estimate the probative value of a sequence of steps carried out by a multitude of service providers, during the transmission of the document.

According to particular characteristics, the method as briefly explained hereinabove includes a step of construction of an acknowledgement of receipt including an information item representative of the overall probative value of the transmission, said acknowledgement of receipt being associated with said document during said association step.

According to particular characteristics, the method as briefly explained hereinabove includes a step of assignment of an overall probative value to a future document transmission and a step of selection of the processing steps to be carried out during this transmission according to the overall probative value that they jointly make it possible to achieve.

By virtue of these arrangements, the sender of a document can choose the service quality level that must be associated with the transmission of a document to a recipient.

According to particular characteristics, during the measurement step, the measurement is a function of the procedure for identifying the sender.

According to particular characteristics, during the measurement step, the measurement is a function of the type of signature implemented by at least one user sending or receiving data.

According to particular characteristics, during the measurement step, the measurement is a function of the type of archiving of the data transmitted.

According to particular characteristics, during the measurement step, the measurement is a function of the result of a computer read.

According to a second aspect, the present invention aims at a system for managing secure electronic correspondence comprising at least one application server handling a directory service for the users of said system and a service for supplying said users with current correspondence accounts, said system handling the scheduling of at least one operation for processing said electronic correspondence belonging to the group comprising composition before sending, transmission of the composed correspondence and archiving of the sent correspondence, wherein said system also provides a service for the end-to-end monitoring of the operations scheduled by the application server.

The advantages, aims and features of this system are similar to those of the method as briefly explained hereinabove, so they will not be reviewed here.

Figure 2A:
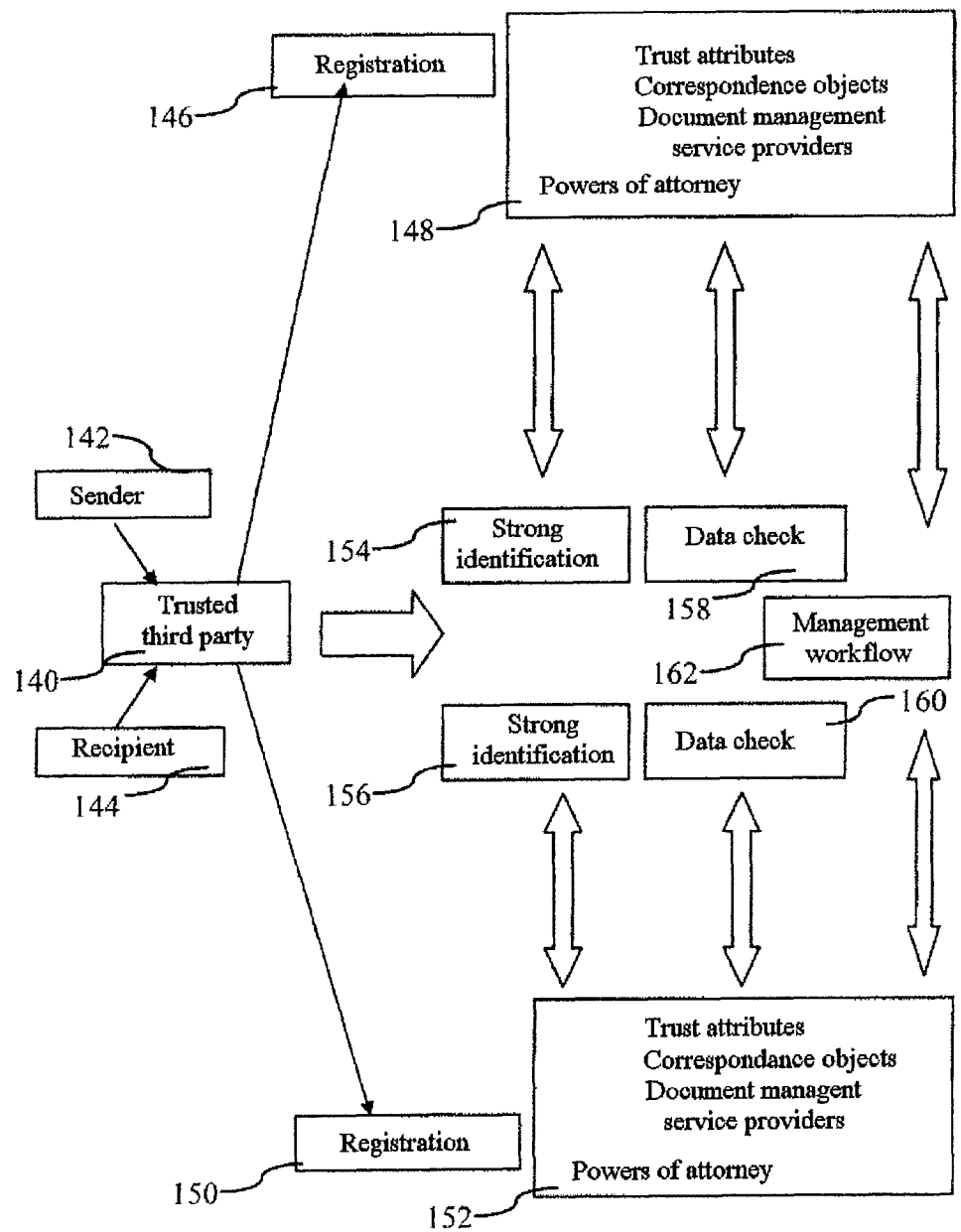
Figure 2B:
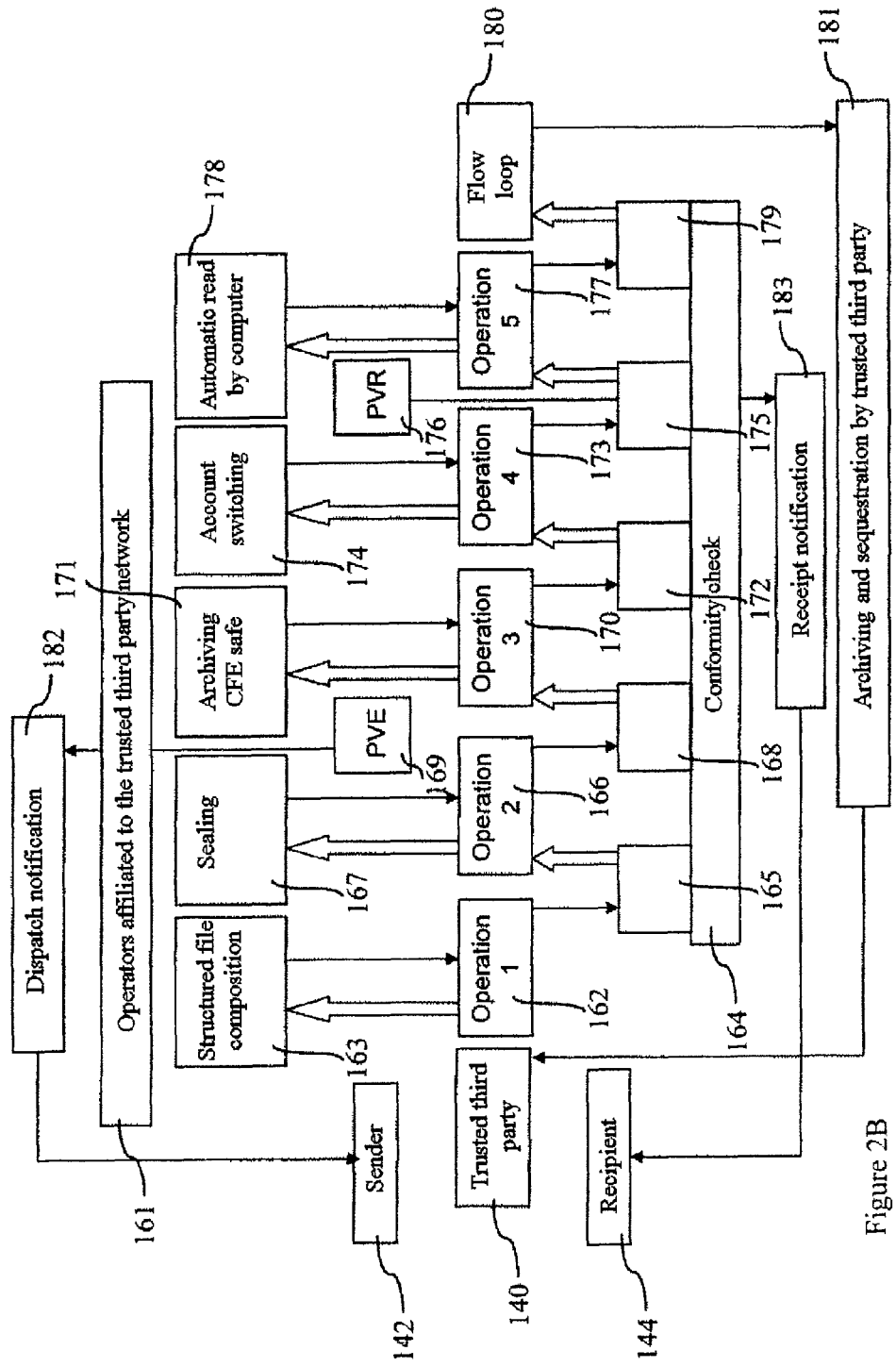

Other advantages, aims and features of the present invention will emerge from the following description, given, for explanatory and in no way limiting purposes, in light of the appended drawings in which:

FIG. 1 represents, diagrammatically, in the form of a functional block diagram, a particular embodiment of the device that is the subject of the present invention, FIGS. 2A and 2B represent, diagrammatically, the functional blocks implemented in a particular embodiment of the method that is the subject of the present invention, and FIGS. 3A to 5 represent, in flow diagram form, steps implemented in a particular embodiment of the method that is the subject of the present invention.

DETAILED DESCRIPTION

FIG. 1 shows a service for securing data transfers 100 comprising a document composition service 102, an archiving service 104, a traceability service 106, a communication service 108, a copying service 110, a checking service 112 and a scheduling service 114. FIG. 1 also shows a trusted third party network 118, operating registration offices, a trusted third party network 122, a sender 124 and a recipient 128 connected to an interface 126 to a secure private office, a sender archiving third party 132 and a recipient archiving third party 134.

The data transfer securing service 100 implements each of the aspects of the present invention. The document composition service 102 retains models or masks of documents provided with attributes, generic to all the users or specific to some of the users who have supplied such document models and their attributes. These attributes may be assigned to the document models via a graphical user interface (not represented), in which menus and contextual help enable the user to choose the attributes of the model according to their meaning and their effects. These attributes, called "trust attributes", which are described below, relate to the identities of the senders and/or recipients of documents, the tasks or task scheduling, the control and validation of the processing operations performed on the documents deriving from these models and/or the security level required for the document.

When a document is composed from a model, the sending user selects a model, supplies the data to document the model, in particular at least an identification of the recipient, an electronic address and, preferentially, a postal address of the recipient, if these elements are not already present in the document model, and the message to be transmitted to the recipient, for example the elements of a bill, a contract, a summons.

The sending user may also, during this document composition, modify and complement the attributes of the document model to form attributes of the document to be transmitted, for example its date of delivery to the recipient in electronic form, its date of delivery in postal form should the delivery in electronic form fail, its date of end of delivery to the recipient in electronic form, the level of authentication of the recipient necessary for the document.

It can be seen that the document composition, an automatic system, for example a computer of the sending user, can supply the elements necessary for the composition, for example in the form of a spreadsheet file comprising these elements, in an ordered manner.

It can be seen that, during one and the same document composition session, a plurality of documents may be composed manually or automatically.

When the document is ready to be transmitted, the sending user validates its transmission to the recipient.

The archiving service 104 conserves any composed document in a non-volatile memory, access to which is reserved to the sender of the document. The conditions for accessing this memory are defined with the sending user, according to known techniques, for example subject to the provision of a user name ("login") and a password, or subject to an electronic authentication. It can be seen that the sending user may mandate an archiving third party 132 to automatically copy each document that he has composed. The archiving service 104 assigns each document that it receives a secure time-stamp.

The traceability service 106 guarantees the traceability of the various steps performed on a document. To this end, it calculates an integrity certificate on the basis of the composed document so that the integrity certificate can be used to detect any modification of the composed document. For example, the integrity certificate is based on a hash function which provides a condensate. The integrity certificate is, on the one hand, associated, by the archiving service 104, with the document placed in memory and, on the other hand, associated with an identification of the composed document, for example an identification of the sending user, of the recipient user and of the time-stamp of the end of composition of the document, these elements being retained by a trusted third party, for example a bailiff.

The communication service 108 makes a copy of the document to be transmitted to the recipient in a non-volatile memory that is only accessible to this recipient, subject to compliance with the access conditions defined by the document's trust attributes, with time-stamping of the copy. After access by the recipient, an archiving third party 134 mandated by this recipient can access the copy of the document and copy it.

The copying service 110 chooses the channel for communication with the recipient (for example, by electronic mail, SMS, fax or postal mail) and the communication to the recipient of at least one message notifying him of the presence of a document for his attention. This communication is made, preferentially, in a number of steps whose scheduling is defined by the attributes of the document to be transmitted. Generally, this communication begins at a date defined by the sender and represented by at least one attribute of the document, in the form of an electronic message sent to an electronic address of the recipient. For example, this electronic message takes the form of an electronic mail sent to the electronic mail address (email address) or of a SMS (short message system) message sent to the telephone address (that is to say, to the telephone number, usually cell phone number) of the recipient.

The attributes of the document may provide for, failing access, by the recipient, within a time limit defined by at least one attribute of the document, to the document that is intended for him and that is retained by the communication service 108, which then notifies the copying service 110 thereof, at least one other message to be transmitted to the recipient, by the communication service 108. Failing access, by the recipient, within a second time limit defined by at least one attribute of the document that is intended for him or at the end of the second time limit, according to the instructions of the sending user represented by the attributes of this document, the copying service 110 transmits the document to the printing third party in order to transmit the document in postal mail form with or without request for notification, or acknowledgement, of receipt.

The checking service 112 checks, during each communication between two services, that all the necessary procedures have been correctly carried out, and that all the information (document model, variable document information, document attributes, time-stamp, correct receipt by the recipient service and acknowledgement of receipt transmitted to the sending service, for example) involved in these procedures is sufficient and has been correctly processed. Each check carried out by the checking service 112 gives rise to a report transmitted to the traceability service 106, in order for it to be traceable.

The scheduling service 114 schedules all the tasks performed by the various services, some of these tasks being, as has been seen, configured according to the attributes associated with the documents.

The operation service schedules the operations carried out on each document and, in particular, the calls to the external services, for example the archiving, authentication, traceability and printing third parties and time-stamp providers.

The trusted third party networks 118 and 122 which use, or not respectively, registration offices, supply the data necessary for checking the validity of user or third party authentication certificates, according to techniques that are known per se, notably related to the PKI.

The registration offices are units of the trusted third party. They handle the statementing and updating of the civil status information with the personal digital objects for the composition, transmission and legal conservation of the documents or structured files. Each registration office undertakes to protect these trust attributes and their confidentiality. With its registration office, the trusted third party then handles the strong personal authentication of the users and the use of the digital objects entrusted for an instant, called "production instant", to the service providers chosen by each sending user. It checks the result of the operation carried out by the service provider or document management operator, and, at the same time, it checks the restoration of the attributes or of the trust objects that can be conserved only by the trusted third party.

The sending user 124 and the recipient user 128 are connected to an interface 126 to their secure private office, these offices being virtual and implemented, remotely with secure access means (for example, based on user name and password entry, use of keys transmitted to a cell phone, or strong authentication, according to the variants or operating modes chosen by the clients or imposed by the procedures and the levels of the attributes assigned to the documents).

A printing third party prints the document to be transmitted by post and its sealing in an envelope, and the delivery to the postal services, with or without request for notification of receipt (the latter being returned directly to the sending user).

Preferentially, when he registers, a user supplies identification elements (name, first name, electronic address, telephone address, postal address) and is assigned a user name (login) and a password. In order for him to be authenticated, he is sent, to his telephone address, a password, for example random or dependent on the elements that he has supplied, the user having to enter this password at his private virtual office to validate his registration, which results in his telephone address being checked. Then, the user accepts a proof agreement indicating the authentication level that he wants to have when he accesses his virtual private office.

Examples of trust attributes that can be assigned to a document and that can be implemented in the various services illustrated in FIG. 1 are given hereinbelow:

the digital identity (also called "login"), an identification attribute, used for composition, the password or authentication certificate, an identification attribute, used for composition, the form and/or structured file, a task or scheduling attribute, used for composition, the internal procedure and/or additional information, a checking and/or validation attribute, used for composition, the external procedure and/or required information, a checking and/or validation attribute, used for composition, digitalization and communication, the authorization, an identification attribute, used for composition and communication, the secret code and/or proxy, an identification attribute, used for digitalization, the partner (recipient) file containing the addresses of a recipient, an identification attribute, used for composition, digitalization and copying, the notification address book containing the addresses of the recipients, an identification attribute, used for composition, communication and copying, the correspondence current account, an identification attribute, used for digitalization, the number of the electronic safe, an identification attribute, used for digitalization, the rating of the digital identity according to the on-line declaration and justifying documents or paper attestations returned to the registration office (identity card, crossed check, etc.) with the mention "certified conforming to original". The source rating becomes dynamic because it varies according to the construction of the personal dossier, its evolution, and the quality of the exchanges made, as explained with respect to FIG. 5. Correspondence failures, such as returns based on "does not live at the address indicated", may thus impair the credibility of the legal address or of the main residence retained in the civil status and in the address book or partners file of the sending user, the rating of the probative value of each step and of the overall probative value of the transmission from the sending user to the recipient user, as explained with regard to FIGS. 4A and 4B, the public certification authority, identification attributes, used for digitalization, the time-stamp, used for composition, digitalization, communication and copying, and the document type, which can take one of the following meanings: confidential, critical, registered with notification of receipt, or ordinary.

The third parties, whose services are not represented on FIG. 1 preferentially provide the following three types of services, generally in ASP (Application Service Provider) mode:

"CRM" (customer relationship management) services, ie assessment of the trust that can be placed in a user, "CPM" (commercial paper management) services, which handle factoring, commercial transfer or securitization, "TRM" (treasury relationship management) services, which handle "payment voucher" functions and may be connected to a proxy server specializing in transfers without transactions of funds for the payment of bills and entire assets with a notification to the treasurers of the companies, the balances and their exchanges.

It can be seen, in light of FIG. 2A, that, out of the functional blocks implemented in one embodiment of the present invention, the trusted third party 140 is related to the sender 142 of the document and to the recipient 144 of the document and to the functions, respectively 146 and 150, for registering trust attributes, correspondence objects, document management service providers and powers, respectively 148 and 152.

The trust attributes comprise, for example, an employee number, a digital identity rating, a signature and agreements. The correspondence objects comprise, for example, service provision models, procedures, acknowledgements of receipt and reads by computer "MdN" (acronym for "message disposition notification"). It will be noted here that the read by computer constitutes the voucher and proof of receipt: validity of the signature certificate, integrity of the transferred file, consistency between structured file and summary list, statement of anomalies, blocking or otherwise. The document management service providers and the powers include, generally, as first operator, the operator responsible for the composition of a document, as second operator, the operator responsible for sealing a document, as third operator, the operator responsible for archiving a document (CFE), as fourth operator, the operator responsible for switching (CCC), as fifth operator, the operator responsible for the read by computer, as sixth operator, the operator responsible for desktop publishing, and so on.

The functions performed on the data stored for the sender and the recipient include a strong identification function, respectively 154 and 156 and a data checking function, respectively 158 and 160.

A managing workflow management function 162 is managed by the trusted third party.

As illustrated in FIG. 2B, this workflow comprises, upon the submission of a document for transmission from the sender 142 to the recipient 144, via the trusted third party 140, by making calls to the operators affiliated to the trusted third party network 161, firstly a first operation 162 which transfers, to a first operator 163, the elements for the composition of structured files, and receives, in return, a structured file. A first function for checking the conformity of the composition 165 is performed by a set of checking functions 164 and the result of this first check is transferred to the functional block of a second operation 166.

The second operation 166 transfers, to a second operator 167, the elements for sealing each file of the document and receives, in return, a sealed file. A second function for checking sealing conformity 168 is performed by the set of checking functions 164 and the result of this second check is transferred to the functional block of the third operation 166.

A transmission report 169 is then constructed and a dispatch notification 182 is transmitted to the sender.

The third operation 170 transfers, to a third operator 171, the elements for the archiving of each sealed file of the document and receives, in return, an archiving validation. A third function for checking conformity of the archiving 172 is performed by the set of checking functions 164 and the result of this third check is transferred to the functional block of a fourth operation 173.

The fourth operation 173 transfers, to a fourth operator 174, the elements for switching accounts of each sealed file of the document and receives, in return, a switching validation. A fourth switching check function 175 is performed by the set of checking functions 164 and the result of this fourth check is transferred to the functional block of a fifth operation 177.

A reception report 176 is sent and a notification of receipt 183 is transmitted to the recipient 144.

A fifth operation 177 transfers, to a fifth operator 178, the elements for the reading by computer of each sealed file of the document and receives, in return, a validation of the reads by computer. A fifth function for checking the reads by computer 179 is performed by the set of checking functions 164 and the result of this third check is transferred to the functional block of a flow loop 180.

This flow loop function 180 transfers, for conservation and sequestration functions 181, performed by the trusted third party, the elements and ratings of all the document transmission steps.

Each of the conformity checking functions generates a rating of the operation to which it corresponds. The flow loop function aggregates these partial ratings to generate an overall rating of the transmission of the document from the sender 142 to the recipient 144.

Figure 3A:
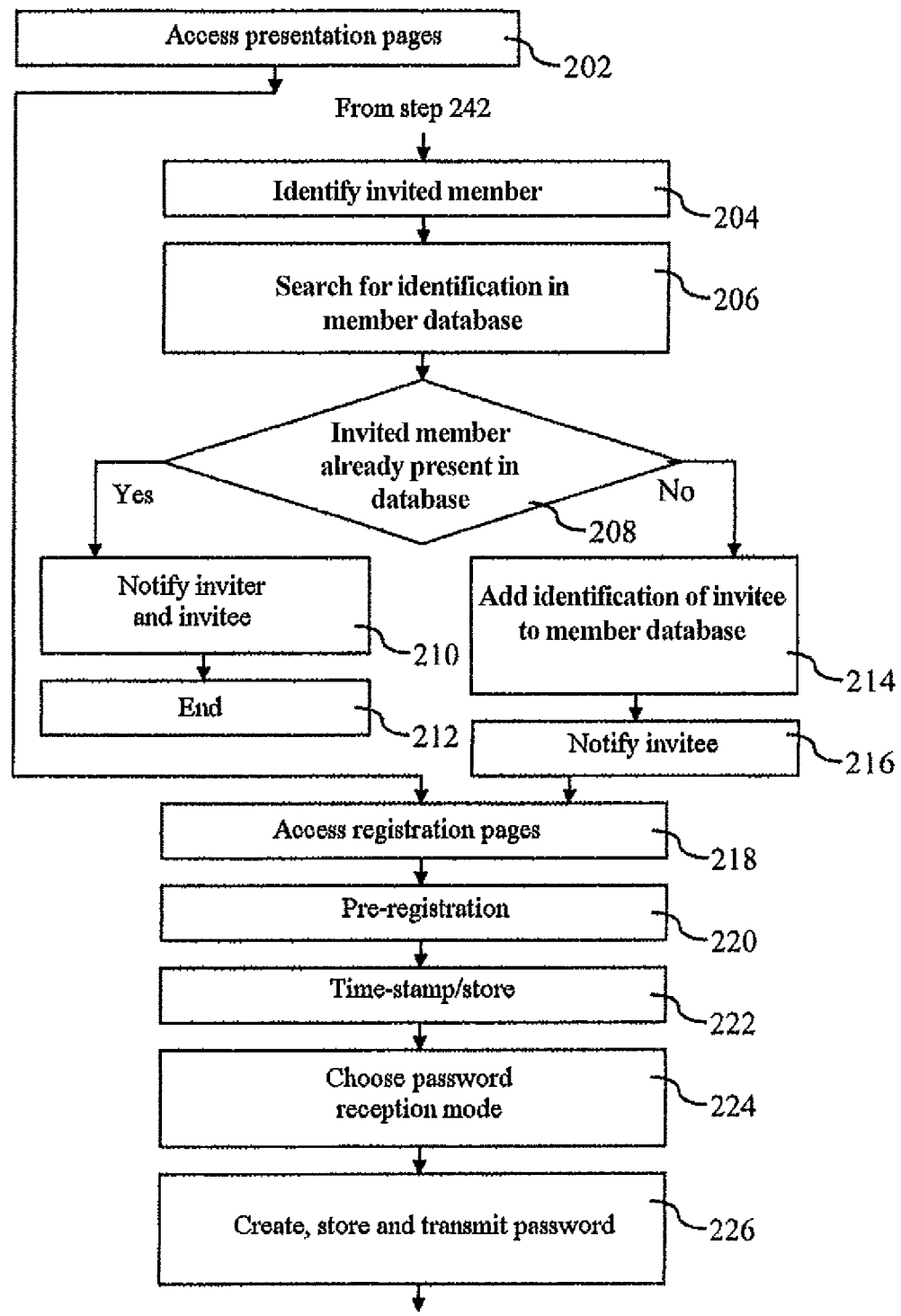
Figure 3B:
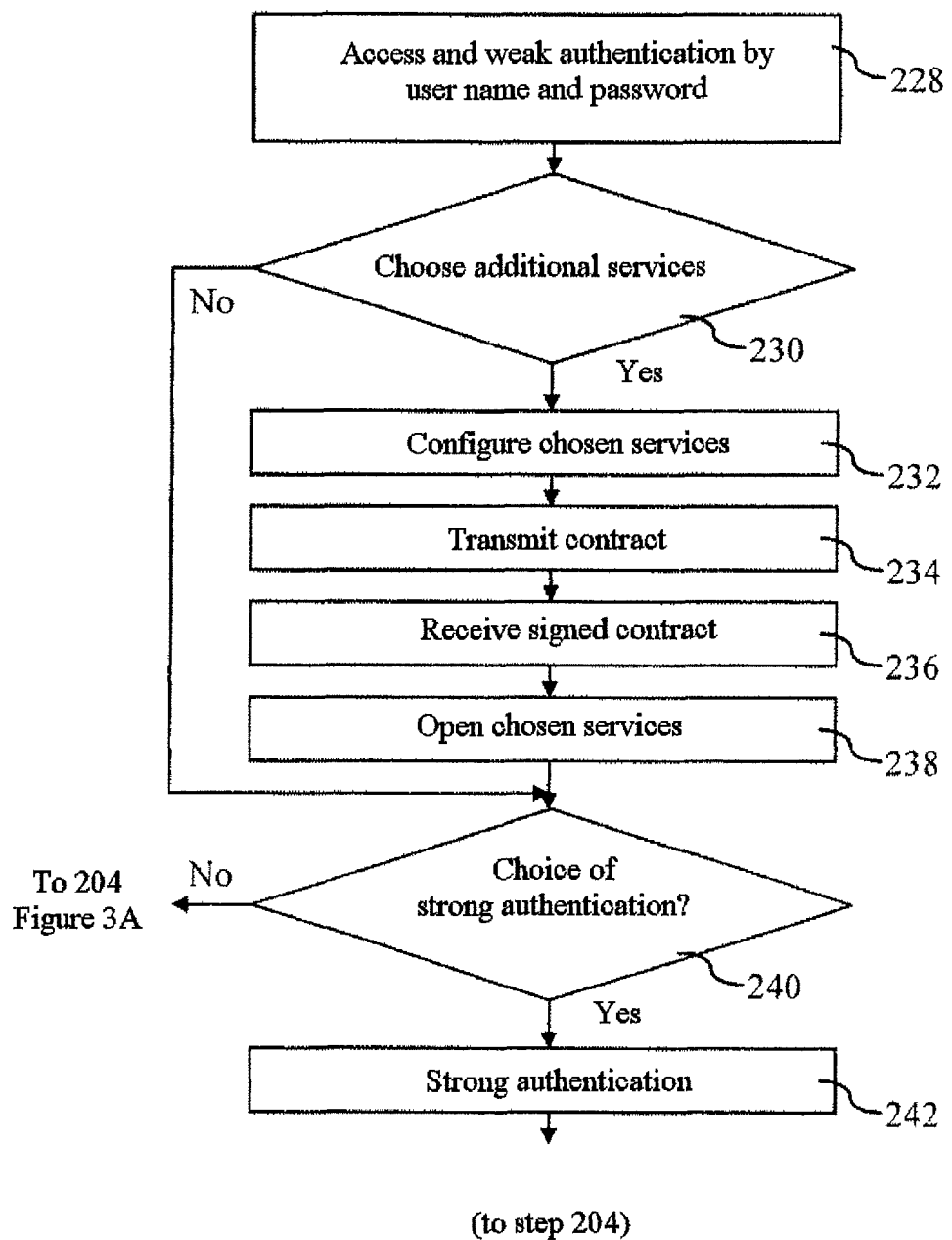

FIGS. 3A and 3B illustrate steps followed for the registration of users with the secure communication services implementing the various aspects of the present invention. FIG. 3A shows a step 202 during which a user who is not yet a member accesses information describing the service offered, for example on a web site. If he decides to become a member of one of the services offered, he switches to the step 218.

For invited users, during a step 204, a user who is already a member supplies an identification of an invited member to whom he wants secure documents to be sent. This identification comprises at least an electronic address of the invited member. During a step 206, the identification of the invited member is compared to the member identifications already listed in the member database to check that he is not already a member.

During a step 208, a determination is made as to whether the invited member is already referenced in the user database.

If the invited user is already a member, during a step 210, this member status is notified to the inviting user and the invited user is notified that the inviter wanted to register him. The phase for registration of the invited user is then completed in the step 212.

If the invited user is not already a member, during a step 214, his identification is added to this database and is assigned a pre-registration status and a minimum rating corresponding to the members declared by third parties. Then, during a step 216, an email is addressed to the invited member to indicate to him which member is inviting him to register with the secure communication system, that the document reception service is free and the electronic address, known by the acronym URL (universal resource locator) to which he should go, for example by clicking on a link inserted into the email, in order to register free of charge with the secure communication service.

During a step 218, the future member accesses the web site corresponding to this electronic address URL and, during a step 220, proceeds with his pre-registration. To this end, during the step 220, he supplies or validates his name, his first name, his postal address (professional and/or personal), his landline telephone number, his fax number, his cell phone number. When validating this information, he accesses his member number and an adherence contract, the general conditions of the document reception service and his user name, which he may possibly modify. The step 220 is time-stamped and the information supplied is stored in the user database, during a step 222.

During a step 224, the future user chooses a reception mode for his password, for example choosing between receipt by fax, by SMS or by postal mail.

During a step 226, a password is assigned to the user, stored in the user database and transmitted to the user according to the reception mode that is chosen with an invitation to validate his registration by accessing his secure virtual private office.

When he accesses this office, the new user supplies his user name and the password that was transmitted to him, during the step 228. During a step 230, the user determines whether he wants to use services that are offered other than simple document reception. If not, he switches to the step 240. If he wants to use more than the document reception service, the user chooses, during a step 232, the parameters of the services that he wants to use. In particular, the user supplies the identity, the postal and electronic address of the people authorized, within his organization, to send or receive documents, powers for these people, details of any archiving third party designated to take copies of the documents sent or received, the means of paying for the services that he wants to use, his personal signature elements and the signature levels that he can and wants to implement.

For all these additional services, during a step 234, a written service agreement is transmitted to the user by electronic and postal means, and he is asked to return a signed copy by postal means.

During a step 236, the returned agreement, signed by the user, is received, checked and stored, and the services chosen by the user become accessible to him, from a step 238. Then, there is a switch to step 240, during which the new user decides whether he wants to benefit from a strong authentication. If he does, during a step 242, his strong authentication is carried out in a manner known per se. If not, or at the end of the step 242, the step 204 is accessed so that the new user can invite new members.

Figure 4A:
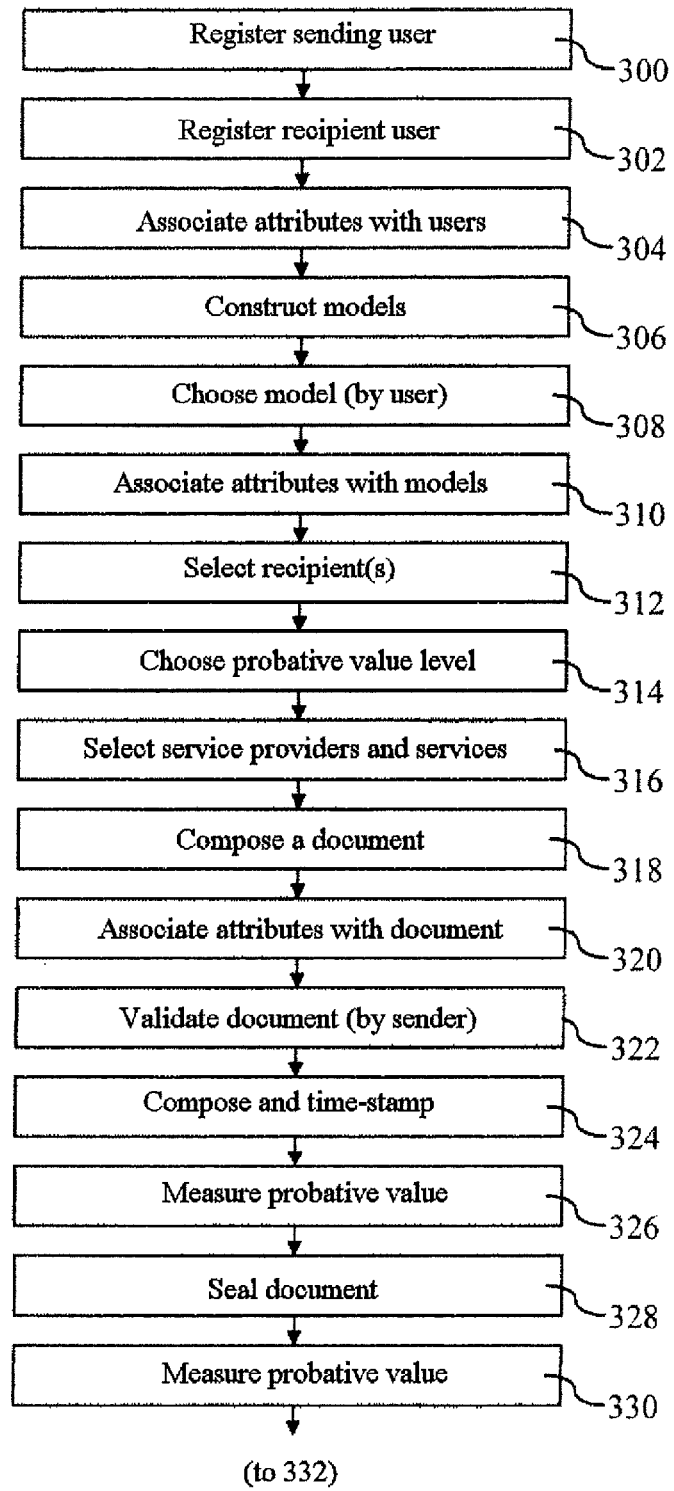
Figure 4B:
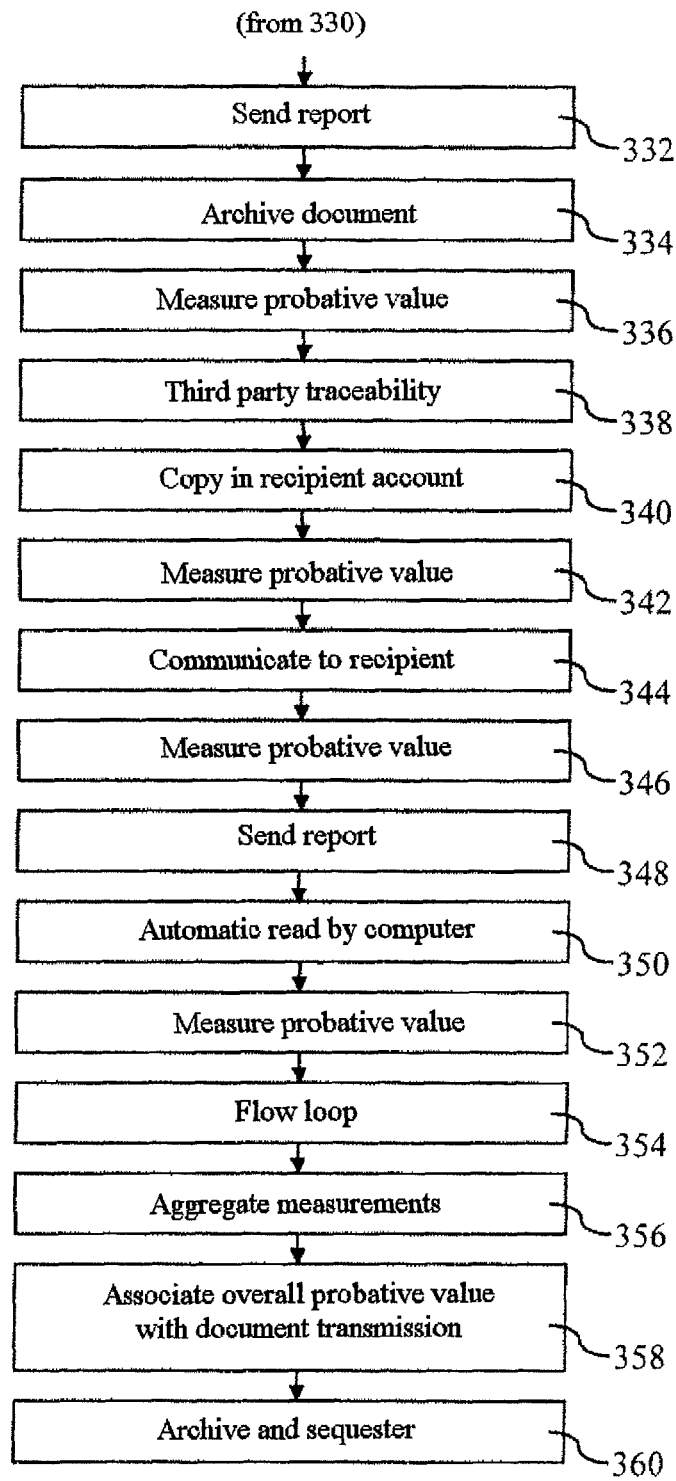

FIG. 4A shows that, after being registered, during a step 300 detailed in FIGS. 3A and 3B, the user who has rights of access for sending registered documents may decide to send a document to a recipient. In this case, after being identified, during a step 302, the user sending a registered document supplies the identification of the recipient of the document. It will be noted that, if this recipient is not referenced in the service's user database, this fact is notified to the sender and a registration step is carried out that is detailed from the step 204, in FIGS. 3A and 3B.

During a step 304, attributes are associated with the sending and recipient users.

Then, during a step 306, the sending user may construct a document model, or access a corresponding document model, that is to say, a generic model available to all the sending users or a model that he has supplied and that has been validated (step 308). In each of these cases, document attributes are associated with the document model, during a step 310, by default and/or by user choice.

During a step 312, the sending user selects recipients. Hereinafter in the description, only a single recipient will be considered, but the invention applies, by duplication of the steps concerning the recipient, to any number of recipients.

During a step 314, the user makes a choice of probative value level that the transmission of the document must achieve or exceed.

During a step 316, service providers and services are selected according to the rating that they are likely to obtain, in order for the sum of their partial ratings to make it possible to achieve the overall rating required by the sending user. This choice may be made by taking into account a cost associated with each of the operations carried out by each of the operators.

During a step 318, the sending user composes the document to be transmitted to the recipient, that is to say that he supplies additional data to edit a document based on a document model. Then, the sending user associates attributes with the document, during a step 320. The data, documents, delivery conditions and details of the sending and recipient users are thus assigned trust attributes attached to the model, to the sender and/or to the recipient, during a step 320. The sending user validates the document, during a step 322.

During a step 324, the composition operator composes the document, as specified by the attributes of the document and, in parallel, the validation by the sending user is time-stamped.

During a step 326, the probative value associated with the composition operation is rated, for example according to the composition operator, the tasks that he executes and the feed-backs that he provides.

During a step 328, a second operator seals the composed document.

During a step 330, the probative value associated with the sealing operator is rated, for example according to the sealing operator, the tasks that he executes, the encryption and/or signature functions that he implements and the feed-backs that he provides.

During a step 332 (see FIG. 4B), a transmission report is prepared, and it is transmitted to the sending user, for example in email form. During a step 334, the sealed document is archived.

During a step 336, the probative value associated with the archiving operator is rated, for example according to the archiving operator, the tasks that he executes, the encryption and/or signature functions that he implements and the feed-backs that he provides.

During a step 338, the document and attachments are legally filed with a third party, for example a bailiff, who returns a legal deposition number.

During a step 340, a copy of the document archived in the sender's electronic safe is archived in a memory that is available only to the recipient, this memory being called "current account".

During a step 342, the probative value associated with the account switching operation carried out during step 340 is rated, for example according to the switching operator, the tasks that he executes, the encryption and/or signature functions that he implements and the feed-backs that he provides.

A message is then transmitted to the recipient, immediately or on the date chosen by the sender, via the channel that the recipient has chosen, to notify him of the presence of a document for his attention and a message is transmitted by email, to the sender, to inform him that the document has been made available to the recipient, during a step 344.

During a step 346, the probative value associated with the operation for transmission to the recipient user is rated, for example according to the transmission operator, the tasks that he executes and the feed-backs that he provides.

During a step 348, a reception report is prepared, as soon as the recipient user takes note of the message, and it is transmitted to the sending user, for example in email form.

During a step 350, reads by computer are carried out. During a step 352, the probative value associated with the reads by computer operation is rated, for example according to the automatic computer read operator, the tasks that he executes and the feed-backs that he provides.

During a step 354, a flow loop is performed, the latter being repeated sequentially and, during a step 356, an overall rating of the probative value of the transmission of the document from the sending user to the recipient user is determined, by aggregation of the partial ratings performed, notably during the steps 326, 330, 336, 342, 346 and 352, as explained in light of the tables given hereinbelow.

During a step 358, the overall probative value is associated with the document that is the subject of the transmission.

During a step 360, the trusted third party performs the conservation and sequestration of the document, of the reports, of at least the overall probative value rating and, possibly, the partial ratings.

The table given hereinbelow is divided into two parts, the first concerning the left-hand columns and the second the right-hand columns. This table should be read as follows:
- the first line shows a representation of the various steps likely to concern a service type, with, below, the maximum and minimum numbers of points assigned to the services,
- the subsequent lines each concern a service type: each number in a column indicating the number of points assigned to this service for a given step (the absence of any number meaning "0" points),
- in the left-hand column, the scores are adjusted to 20 to be more easily understood by the users (by multiplying the number of points obtained, out of 135, by a factor of 20/135) and rounded to the nearest half-point.

The abbreviations used are as follows:
column 1: "Exp Env d.o" means "Sender sends data",
column 2: "Tdc Cdc Idd" means "Trusted third part identity and data conformity check",
column 3: "Tdc Prép Wkf Se/pr clépu" means "Trusted third party preparation of hybrid or dematerialized management workflow",
column 4: "Ope Comp Scel" means "File composition and sealing operator",
column 5: "Tdc Cdc c&s" means "Trusted third party file composition and sealing conformity check",
column 6: "Tdc Not Exp Pve" means "Trusted third party Sender notification of Send/legal signature report",
column 7: "Op TA doc" means "Operator for archiving (archiving third party) the original document in 1-2 specimens (cfe)",
column 8: "Tdc Cdc Arc doc" means "Trusted third party archiving with probative value conformity check",
column 9: "Op CPs" means "Secure correspondence operator (correspondence current accounts)",
column 10: "Tdc Cdc CPs" means "Trusted third party secure correspondence conformity check",
column 11: "Tdc Not Des Pvd" means "Trusted third party recipient notification of receipt/legal signature report",
column 12: "Op Co Sc aR" means "Composition and receipt acknowledgement coupon sealing operator",
column 13: "Tdc Cdc AR" means "Trusted third party composition conformity and receipt notification coupon sealing check",
column 14: "Ope Arc AR" means "Receipt acknowledgement archiving operator",
column 15: "Tdc Cdc Arc AR" means "Trusted third party receipt acknowledgement archiving conformity check",
column 16: "Ope Lao transf" means "AS2 transmission operator read by recipient computer",
column 17: "Tdc Cdc Lao transf" means "Trusted third party read by computer conformity check",
column 18: "Dest mdn retour" means "Recipient sends return of MDN: proof of correct one-to-one computer read",
column 19: "Tdc Cdc mdn retour" means "Trusted third party MDN/Proof from recipient conformity check" and
column 20: "Tdc Csv Mdn" means "Trusted third party conservation and sequestration of MDN".

line 1: "FI/LHS" means "Ordinary hybrid letter" and is given the score 3/20,
line 2: "FI/LHR" means "Registered hybrid letter" and is given the score 4/20,
line 3: "FI/LHRAR" means "Registered hybrid letter receipt acknowledgement signed" and is given the score 6/20,
line 4: "FI/LDS" means "Ordinary dematerialized letter" and is given the score 7/20,
line 5: "FI/LDR" means "Registered dematerialized letter" and is given the score 8/20,
line 6: "FI/LDRAR" means "Registered dematerialized letter receipt acknowledgement" and is given the score 12/20,
line 7: "FI/LDRARC" means "Registered dematerialized letter receipt acknowledgement encrypted" and is given the score 11/20,
line 8: "FS/DHR" means "EDI or XML structured file/Registered hybrid document" and is given the score 8/20,
line 9: "FS/DHRAR" means "Registered hybrid document receipt acknowledgement" and is given the score 9/20,
line 10: "FS/DDR" means "Registered dematerialized document" and is given the score 10/20,
line 11: "FS/DDRAR" means "Registered dematerialized document receipt acknowledgement" and is given the score 15/20,
line 12: "FS/DDRARLAO" means "Registered dematerialized document receipt acknowledgement with one-to-one read by computer" and is given the score 18.50/20.

| Pts | Exp Env d.o 1 | Tdc Cdc Idd 2 | Tdc Prép Wkf Se/pr clépu 3 | Ope Comp Scel 4 | Tdc Cdc c&s 5 | Tdc Not Exp Pve 6 | ope TA doc 7 | Tdc Cdc Arc doc 8 | ope CPs 9 | Tdc Cdc CPs 10 | Tdc Not Des Pvd 11 | ope Co Sc aR 12 | Tdc Cdc AR 13 | ope Arc AR 14 | Tdc Cdc Arc AR 15 | ope Lao transf 16 | Tdc Cdc Lao transf 17 | Dest mdn retour 18 | Tdc Cdc mdn retour 19 | Tdc Csv Mdn 20 |
|---|---|---|---|---|---|---|---|---|---|---|---|---|---|---|---|---|---|---|---|---|
| 135 | 8 | 8 | 4 | 20 | 4 | 6 | 10 | 4 | 10 | 4 | 6 | 10 | 4 | 10 | 4 | 10 | 4 | — | 4 | 5 |
| FI LHS | 2 | 2 | | | | 1 | 1 | 4 | 5 | 4 | | | | | | | | | | |
| FI LHR | 4 | 4 | | | | 1 | 1 | 4 | 10 | 4 | | | | | | | | | | |
| FI LHR AR | 6 | 6 | | | | 1 | 4 | 4 | 10 | 4 | | | | | | | | | 2 | 2 |
| FI LDS | 8 | 8 | | 5 | 4 | 2 | 4 | 4 | 10 | 4 | | | | | | | | | | |
| FI LDR | 8 | 8 | 1 | 5 | 4 | 3 | 4 | 4 | 10 | 4 | | | | | | | | | | |
| FI LDR AR | 8 | 8 | 2 | 5 | 4 | 3 | 4 | 4 | 10 | | 4 | 10 | 4 | 10 | 4 | | | | | |
| FI LDR ARC | 8 | 8 | 4 | | | 3 | 4 | 4 | 10 | | 4 | | | | | | | | | |
| FS DHr | 4 | 4 | | 20 | 4 | 4 | 1 | 4 | 10 | 4 | | | | | | | | | | |
| FS DHr AR | 4 | 4 | 2 | 20 | 4 | 4 | 4 | 4 | 10 | 4 | | | | | | | | | | |
| FS Ddr | 8 | 8 | 2 | 20 | 4 | 4 | 4 | 4 | 10 | 4 | | | | | | | | | | |
| FS Ddr AR | 8 | 8 | 3 | 20 | 4 | 4 | 4 | 4 | 10 | 4 | 4 | 10 | 4 | 10 | 4 | | | | | |
| FS Ddr AR Lao | 8 | 8 | 4 | 20 | 4 | 4 | 4 | 4 | 10 | 4 | 4 | 10 | 4 | 10 | 4 | 10 | 4 | | 4 | 5 |

Figure 5:
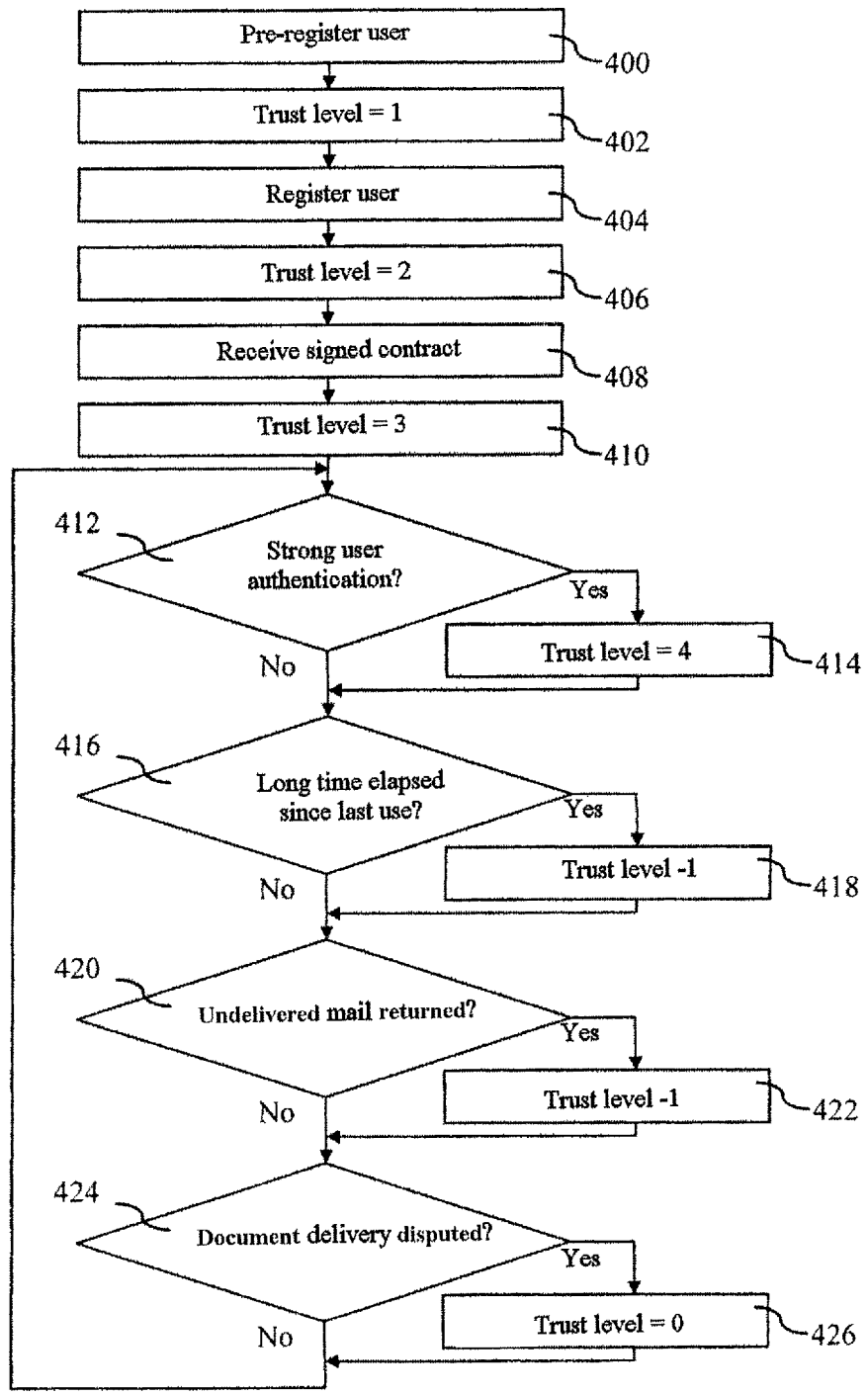

In FIG. 5, it can be seen that, after the user pre-registration step, 400, the attribute representing the trust level linked to this user takes the value "1" (step 402). After the user registration step, 404, the trust level takes the value "2" (step 406). On receipt of the service agreement signed by the user (step 408), the trust level takes the value "3" (step 410).

A determination is then made as to whether the user performs a step for supplying a strong electronic authentication, during a step 412. If so, the trust level associated with the user takes the value "4" during step 414. If not, or at the end of step 414, during step 416, a determination is made as to whether a long period, for example longer than three months, has elapsed since the last time the services were used by the user. In such a case, during a step 418, the trust level associated with this user is decremented by "1", it being noted that each new use of the service by the user restores its prior trust level.

Otherwise, or at the end of step 418, during step 420, a determination is made as to whether a postal mail routed to him has not been delivered to the recipient. In such a case, during step 422, the trust level associated with the user is decremented by 1.

Otherwise, or at the end of step 422, during step 424, a determination is made as to whether the user has disputed the delivery of a document. If so, the trust level associated with the user takes the value "0". Otherwise, or at the end of step 426, the procedure returns to step 412.

As can be understood in light of FIG. 5, each user is assigned a dynamic trust level, which evolves over time, according to the events that affect his relations with the services offered.

This trust level associated with a potential recipient of a document is used to assist the sending user or the automatic service in choosing the conditions for identification or delivery of a document to the recipient, for example the delay separating the electronic communication of a notification of presence of a document available to the recipient and the transmission of the document to a printer or the authentication level required to be able to access a document.

Thus, the system of the invention and the method that it implements guarantee all of the abovementioned processes so as to warrant that there are no security, confidentiality and authenticity gaps throughout the exchanges and operations performed between the trusted third party network and the service provider. Furthermore, any anomaly may be sorted out retroactively either on the same computer site or on two remote sites. The operating mode guarantees interoperability, assuming that the various operations of the "document value chain" are performed by a number of service providers around the trusted third party network, for example, billing service provider and legal archiving service provider.

The implementation of the present invention thus provides, by its operating mode:
  a guarantee of security (certification, encryption),
  a guarantee of confidentiality (encryption of content and of container),
  a guarantee of dynamic identity,
  a guarantee of file integrity,
  a guarantee of conformity (procedures and essential information),
  a guarantee of legality (legal or tax arrangements, EDI, XML, signature),
  a guarantee of probative legal value (trusted third party registration),
  a guarantee of traceability (logging of operations),
  a guarantee of mail pairing or matching (legal documentation),
  a guarantee of interoperability (between trusted service providers).

The checking server 112 stores the tasks carried out (it supplies a summarized list of the tasks) by the four modules (document composition service 102, archiving service 104, communication service 108 and a copying service 110), regardless of their geographic locations (centralized or distributed) with the requests relating to the trusted third party to check:
  identity of the owner,
  identity of the trustees,
  personnel authorizations (specific tasks),
  forms deposited,
  form procedures,
  login/password information,
  partner or counterpart files,
  choice of signature ("SEP", "SEA", "SEQ", explained below) and
  encryption proxy with secret code.

If the documents are processed in a distributed manner and off-line with the batches broken up, consolidation of the tasks makes it possible to identify anomalies and retrieve the outstanding documents.

The present invention implements the concept of "value period", which means that the validity delay, for example twelve hours, for a mail to be transmitted, to an insured person for example, may automatically cause uncompleted tasks to lapse and trigger an alert to the sender of the document.

The lists of tasks, or "job lists", are transmitted in very secure mode by the "flowtrack" technology, which handles the checks on the operator authorized to perform a task, the pair of machines intercommunicating, the encryption task and locking in the event of nonconformity). This technology makes it possible to schedule the tasks with the trust attributes necessary with respect to each operator and operator function with a time-stamp, an imprint, for example of "shat" type, the transmission pair (trusted third party/operator) and the name or the function of the machine or of the server addressed (composition, switching, archiving, copying, communication). Any anomaly in the scheduling causes an alert to be output or the scheduling to be stopped. The processing of the scheduling flows is made "parallel" to manage the scalability of the document processing operations with probative legal value.

Preferentially, some information is not, in any circumstances, stored (for example, information of the user name and password type, or the encryption proxy/secret code), but the system stores (or logs) the result of the operation or of the check. Obviously, such information is time-stamped.

The most critical operations may be outlined in the "log" memory: the start of an operation, the end of an operation and the result status. This reinforces the validity of the information. For example, for the time-stamping of the document signature, the condensate, or "hash", of the document is time-stamped (and a certain proof of possession is obtained), then the hash is signed and the result is time-stamped (and a precise signature interval is thus obtained).

It can be seen that, if a mechanism of a type known to those skilled in the art by the name "syslog" is used, it is preferable:
  to implement a secure communication protocol (even if everything is in the same clean room) with a check on the "identity" of the machines concerned, to "sign" the stored data or "logs", by a symmetrical signature procedure, the signature key being generated at regular intervals and exchanged by an encrypted process, to countersign the stored data at regular time intervals with an asymmetrical signature.

The symmetrical signatures and asymmetrical counter signatures may be stored in a specific log which makes it possible not to disturb the content of the information log. The centralized logs must be stored on two different machines in real time.

Centralized storage does not preclude local storage on the machine performing the operation. On the other hand, the local logs do not need to be reinforced.

Finally, all the participating machines must be synchronized in time ("time-synchronous").

One gives, throughout the end of the description, information in addition to the information given above, to constitute particular embodiments or variants of the embodiments explained hereinabove.

The digitalization system is a set of subsystems obeying a computer data processing method that guarantees:

creation of a multitude of different documents: forms, structured files, checking of the discriminating sensitive characters: trust attributes, rules, procedures, switching of the management information: two-part exchanges, symmetrical conservation of proofs: bilaterality of archived originals and distribution of the services requested: copies, data sharing.

In the case of implementation of an architecture centered on a web server (i.e. web-centric) with distributed legal functions, the uniqueness of the platform is assured by two agents acting in the same data center so as to take no operational risk in the transfer of information.

The storage of the digital identities and of the management rules for each person or company is "web-centric" or supra-national, in the same way as the composition of the documents and the switching of messages that are necessary to management of the system.

However, legally or contractually, the electronic original referring to the national legal provisions and the paper copy printed close to the recipient conform to archiving "measures" and local hardware contingencies, which justify a dedicated cross-border correspondence network.

Only certain trust functions may be distributed on a network of secure correspondents without interfering with the distributed operational modules. These are notably functions linked to the time-stamping and certification of the digital identities referring to the national revocation lists.

Preferentially, the symmetry of the archiving proofs and the switching of the messages in duplicate, that is to say by producing two documents on the basis of the original document, are applied and guarantee the authenticity of all the original documents.

For the combination of the digitalization functions distributed over two agents hosted in the same data center, one of the agents is assigned to the trusted third party network, called "RTC". The principle of neutrality of the trusted third party means that it keeps the trust attributes of the operating persons without itself performing document operations with probative legal value, said operations being entrusted to the second agent. This first agent "RTC" is primarily a registration office that is a repository for the trust attributes involved in the mail operations or in the transactions that are dematerialized. It is also this first agent which follows the digital identity certificate revocation lists and the time markers (time-stamping by atomic clocks).

On each digitalization process, and in the sequence of the missions carried out by the service provider agent, it communicates the trust attributes that are involved in the configuration of the operations: composition, conservation-archiving, communication and copying.

Depending on the anomalies reported in these circumstances by the service provider agent, the first agent may modify the rating of the digital identity or revise the status of certain doubtful procedures that are in force (systemic regulation).

The second agent is assigned to the trust missions. It manages the digitalization process from end to end:

composition of the structured files, archiving of the documents and of the proofs of exchanges, switching of messages or PDF images, and production of copies by all means.

Between these four modules, which are involved in the digitalization of the documents and of the electronic transactions, there is an audit track with trust and conformity checks, and anomaly records.

All this information is listed to preserve the traceability of each "original" between these modules and with the local correspondents invoked.

The digitalization process thus described effectively guarantees that the three dimensions of the legal document based on a structured paper content (written or printed), organized exchange procedures and the handwritten signing of the parties, are faithfully transposed into an electronic version with probative legal value.

The three electronic dimensions with probative legal value are therefore satisfied:

people, by strong electronic authentication, document, by certification of the structured file, and procedures, by traceability, signing and archiving.

For each user, the digitalization is applied simply by virtue of a "private correspondence office" made available by the trusted third party network.

Each user is the owner, for digitalization purposes, of the documents sent or received, of a current correspondence account for message switching, and an electronic safe for the legal archiving of the correspondence proofs.

By entrusting his trust attributes to his trusted third party, via a secure communication network, each user can delegate powers to all the correspondence tasks involved in the composition of the documents, their transmission, their conservation and their copying.

The novelty of this functional architecture also allows for a "mobile and collaborative management" of the dematerialized documents by individualizing all the dematerialized correspondence tasks with the internal procedures and the electronic signatures.

The correspondence tasks are carried out in complete security regardless of the country and its regulatory constraints.

It can be seen that there is a real legal and functional interoperability in the digitalization of the documents because the traceability can be controlled from end to end, and the legal archiving of the electronic proofs may be distributed according to the authentication and conservation measures in force nationally.

The digitalization is organized over two independent structures:

a trust system in the exchange agreements (measurement and transmission systems) and a document management system (creation and services).

The trust system is based on a technology for storing digital identities, personal attributes, revocation lists and time markers.

The management system comprises four operational modules which host the "generic codes", that is to say, the digital identities and the trust attributes of the parties involved in the transaction, whether it is an ordinary mail file or a structured contract file.

The digitalization is operationally performed by service providers who provide four types of services or modules: composition of the documents, archiving of the originals, message switching and copying of evidence.

The management of the documents exploits each operational module by summarizing all the tasks carried out with the corresponding trust attributes on an audit track.

This "traceability" makes it possible to systematically check, by an exhaustive "list", the internal procedures, the external rules and the legality and trust measures.

The "security and trust chain" thus exists by construction by virtue of the combination of modules/tasks/trust attributes summarized in each sequential "list", time-stamped, deposited in an electronic safe, and sequestered with a bailiff.

With regard to the adherence of a user invited by another user, a member registered with the trusted third party network RTC, the latter entrusts to the trusted third party his "partner file" or "correspondents file", in other words, his address book.

The trusted third party is mandated by the member to send invitations to open a "correspondence current account" to all his counterparts in his address book.

This proposal addressed to the recipient, or invitee, concerns the use of a "private correspondence office", free of charge for the "incoming mail". The invitations are sent:

by secure electronic mail (email) (if so indicated by the address book), or by postal mail via "Posteasy" (registered trade mark): ordinary letter with a prospectus, or by short message SMS (if the address book indicates the cell phone number), or by a combination of all three.

If this proposal is agreeable to the recipient, he is invited to connect to the registration interface and open the correspondence current account: the URL is indicated so as to be able to connect.

Naturally, by accepting the invitation and "his" correspondence office, the recipient of a first registered letter with all-electronic receipt acknowledgement can instantaneously read his mail and download it.

The invitation is by name. It contains an invitation number. It indicates the name of the inviting user. The proposal to open the "correspondence current account" comprises:

A. Free Services:
 a "private correspondence office" for receiving mail or secure documents:
  with instantaneous notification of the "deliveries" via email or SMS,
  with a function of receipt acknowledgement with probative legal value,
  with PDF Image or XML Pivot downloading function, and
  with audit track for each certified mail correspondence.

an "archiving space" for the "incoming documents" conserved in the data center (a maximum duration for a free of charge service may be set, for instance, two years on a rolling basis)

B. Chargeable Services:
 sending of outgoing mail or documents,
 legal archiving of outgoing mail or documents (three years),
 sharing of folders in "collaborative mode" in a "data center",
 management of secure emails stored in the data center, then time-stamped and sequestered with a bailiff.

If the invitation is agreeable to him, the invitee registers in two stages.

During a pre-registration phase, the invitee details his identity on the pre-registration form:
 name, first name,
 physical/postal address, and
 telephone address: landline, fax, electronic fax, cell phone.

Then, the form asks him to approve the general service conditions (also known by their acronym "GSC"): the "model services" for mail for which the correspondence third party handles secure transmission with probative legal value are described:
 ordinary letters or hybrid documents,
 hybrid registered letters or documents, and
 dematerialized registered letters or documents.

He is then asked to choose a personal user name (login) to access his correspondence office and his correspondence current account. The invitee is told that he will immediately receive a "password" via the communication means of his choice:
 by cell phone,
 by fax, or
 by sealed letter.

Then, during a registration phase, when provided with his "password", the holder can finish registering with his private office and his correspondence current account. It can be seen that there are, in this office, optional free management functions. For example, this office gives access to a heading intended for the registration of users by the holder of the correspondence account. Access to the correspondence current account's log also makes it possible to follow all the mail transactions with their transmittal or reception status information. If the first, pre-registration session has been interrupted, the invitee must reconnect with his user name and his password. If necessary, he complements the civil status information by giving the exact identity of the administrator of the correspondence current account (the holder).

The administrator specifies, for the reception operations concerning each model service (mail types), the people who are authorized (the trustees): name, first name, address, cell phone, email, fax. The administrator specifies, for each designated person, the operations that are authorized, for example, out of transmitting documents as registered letters with receipt acknowledgements, reading documents, downloading documents and accessing the log.

The administrator assigns each trustee a user name and a personal password and is responsible for communicating these personal access data to these people.

As a variant, the registration office may transmit separately the user name, with authorizations, by secure postal mail, and also, a password, for example to the recipient's personal cell phone, in SMS form.

If necessary, for pay operations, the administrator specifies the people authorized: name, first name, address, cell phone, email, fax (same authorization and secure information procedure).

The pay operations on the model services (for example, the mail types) relate to the composition/validation of documents, dispatch by all means, and faithful and durable archiving.

The holder of the office and of the secure correspondence account also chooses one of the payment means made available to him.

The administrator checks the "personal signature" tab in order to be sent a secret code:
by SMS, or
by fax, or
by postal mail.

It can be seen that the secret code is a strong authentication for the receipt acknowledgement carried out by the recipient with respect to his correspondence third party who has his proxy to encrypt, time-stamp and legally archive this receipt.

To finish registration, the holder is prompted to read the trusted third party network membership agreement, this trusted third party network establishing the rules for exchanges of mail or of electronic documents with probative legal value.

To validate his trusted third party network membership agreement, he simply has to activate his secret code over the interface to sign his membership form.

Registration is finished. A conformal copy of the membership agreement mentioning the member number and the correspondence current account number is sent in a registered letter with receipt acknowledgement to the declared postal address.

The trusted third party acting as registration office will confirm the digital identity if:
the receipt acknowledgement is returned signed by post, and
the conformal paper copy (LRAR) is returned signed by the member with the requested proofs of national identity or civil status, these also being signed by hand as "certified conformal".

The trusted third party delivers, according to the quality of registration obtained, an adherence certificate with a digital identity (IN) rating of 1 to 3+.

The registration interface in his correspondence office specifies that, if the member has obtained a rating for his digital identity equal to or greater than 3, he may additionally request a free "member electronic signature certificate" or else a "qualified signature certificate" that is chargeable because it is delivered by a public certification authority.

With regard to the confirmation of the registration, the inviter is instantaneously informed of his registration. The member number of the invitee is added to his address book. He knows the digital identity rating of his counterpart. If the registration costs are chargeable to him, they are debited to his correspondence financial account.

The recipient of an all-electronic registered letter, called LRAR, or a recorded letter, receives a notification explaining to him that he can acknowledge receipt and read his document instantaneously by registering immediately.

When his registration is finished, he completes the "receipt acknowledgement" that appears on his office's interface:
he checks the document number to be opened, and
he enters his secret code.

Immediately, the document is opened and he can read its content.

The correspondence third party uses an electronic safe to archive the registered document with its encrypted and time-stamped receipt acknowledgement.

If the recipient has not responded to the digital LRAR mail delivery notification, accompanied by a personal invitation, the document is automatically treated as hybrid mail with a paper legal trace routed by mail when the response delay exceeds two to three days.

The agreement between the parties (sender/provider and recipient/client) provides for the following information to be completed:

A. The Identity of the Parties:
company: articles of association, Kbis form, designated administrator, trustee, authorized personnel, addresses (mail/billing), details (telephone, fax, cell phones),
qualification of the parties:
for mail (both sender and recipient),
for the bill (supplier, client), and
for other contracts (specify).
other information:
proxy: designate the person and his function.

B. The Nature of the Exchanges:
mail models: files (structured or not),
billing models: file (structured or not), and
contract models: files (structured or not).

C. The Nature of the Signature:
signature on sending:
mail:
bill, and
other contracts,
signing on receipt:
mail,
bill, and
other contracts.

D. The Choice of "Trusted Service" Providers: Options for Each Party.

For the "very best" digitalization, the one recognized by the best rating delivered by an independent audit and appraisal consultancy (metric assessment system), it is essential for all three systems—digital composition, electronic communication and legal archiving—to be incorporated with the same trusted third party and in the same data center.

The operational and systemic risk is almost zero given these conditions, since the least error is corrected by the platform whereas, between a number of service providers, the analysis of the error and the risk of dispute defers the solution between the parties by some hours or days.

With regard to the designation of the trusted third parties, their mandates are chosen by the parties with their remote management "objects".

The digitalization of registered or recorded documents is usually carried out by a neutral trusted third party (in accordance with current regulations) so as to establish:
the probative value of the document,
the receipt acknowledgement, and
the legal archiving of the proofs.

In this function, the trusted third party intervenes in the correspondence between the parties involved in three phases:

A. Composition and/or Validation of the Document
authentication of the sender and integrity check,
verification of the document and/or of the structured file,
composition of the licensed original, and
validation and personal signature.

B. Transmission and Receipt of the Message
certification of signed messages,
message switching (bilaterality),
electronic communications (notification, downloading, etc.), and
time-stamping of registered messages.
C. Conservation and Restoration of Proofs
legality and conformity check,
legal deposition in electronic safe,
activity monitoring and certification of proofs, and
sequestration with bailiff and restoration.

The sender transmits to the trusted third party either a "signed document" or a "structured data file". In both cases, the trusted third party checks the conformity and flags any anomalies.

The original of the document is assigned a number or a bar code before being signed for transmission to the recipient.

The recipient is notified, by SMS, fax, electronic fax or email, to access the document on his secure correspondence "current account".

The dematerialized registered document is conserved by legal deposition in two electronic safes (CFE) to ensure faithful and durable archiving.

The registered document is then transmitted by message switching to the two secure correspondence current accounts.

For the "registered document" received by the recipient to be read, a "receipt acknowledgement" slip must first be signed. This dematerialized slip confirms the receipt with the references of the deposited envelope (number, record number in correspondence current account and legal deposition number in electronic safe).

On the other hand, a "recorded document" is only subject to a notification and a delivery to correspondence current account and reading it requires authentication with the "personal signature" of the recipient who has the necessary authorization.

For document transmission, the sender and the recipient must be members of the secure correspondence network RCS.

If the recipient is not registered, he receives an invitation informing him of the delivery of a registered document, and specifying that "reception services" are free of charge.

The electronic signatures with a rating level of three are usually intended for dispatch and receipt acknowledgement (concept of electronic signature book).

In particular embodiments, a member electronic signature (SEA) is implemented with a private certificate and reserved for exchanges in the secure correspondence network ("partners" file).

The existence of a qualified electronic signature (SEA) which is intended for all the exchanges in the public domain and in the network of member users is also proposed or recognized.

A member can either use a pre-existing signature employed for other personal applications (tax returns, for example), or be granted a qualified signature issued by a certification authority to which the system of the present invention has transmitted the registration folder if the notation is "3+".

The RTC handles the legal archiving and the restoration of the dematerialized documents over the time periods chosen by the members (1 to 10 years).

The difference between a registered document and a recorded document lies in the notification and the receipt acknowledgement:

for a "registered" document, the notification includes the number of the legal deposition in the electronic safe and the record number in the correspondence current account. The authenticated recipient, included in his correspondence's partner file, must complete the dematerialized "receipt acknowledgement" form, indicating the legal deposition number entered on the notification, and by using, by choice, his personal (SEP), member (SEA) or qualified (SEQ) signature. The registered document cannot be read without having completed the dematerialized "receipt acknowledgement" slip.

A "recorded document" notification has only a record number.

The digitalization procedures for the correspondence documents with probative value, recorded letter ("LS") or registered letter ("LR"), are described hereinbelow.

"Organized correspondence" relies on two principles: the conformity and the legality of the electronic mail, on the one hand, and the prior membership to an agreement or a secure correspondence network ("RCS"). Reference can be made to the membership contract model. As explained above, the modalities for registration with the secure correspondence network cover either spontaneous application or the invitation procedure.

With regard to the conformity and the legality of the electronic mail with probative value, these concepts are applied to the structured or unstructured file from which the electronic mail document prepared by the dispatcher, or sender, is composed.

Mail correspondence relates to recorded letters ("LS") or registered letters ("LR"). These letters can be prepared either on the user's workstation, or directly on the trusted correspondence third party's platform, in other words, prepared in a data center on models made available to the users.

These letters are created either as "free text", usually qualified as "unstructured files", or, on the other hand, these letters are created as "structured files". The benefit of a structured file is that it observes a form containing the necessary data located with tags in particular fields; some of these data are essential information such as the corporate name or the address of the recipient, and all these fields are subject to consistency checks. The other benefit of a structured file is that the creation, publication, transmission and archiving of the document are subordinated to conformity or legality checks that are entrusted to the trusted third party in the interest of both parties to the correspondence.

All these constraints are naturally itemized in the exchange agreement signed by the two parties before beginning their "organized correspondence".

The "structured file" can be created and validated on the sender's workstation before the document entrusted to the trusted correspondence third party is dispatched.

Otherwise, the data are prepared on the workstation and communicated to the trusted third party who merges them on the document model deposited with him. In this case, the sender notified of the composition done by the trusted third party, can remotely validate the original of the document before it is dispatched to the address of the recipient by the chosen transmission means. In this precise case, the trusted third party who is the depositor of the form and who receives the data to compose the original document, checks that the essential information is correctly filled in before proposing to dispatch the document for the sender to sign.

The correspondence agreement signed by each of the parties, independently of one another, makes them adhere to the secure correspondence network ("RCS"). In this respect, they are members attached to the secure correspondence network "RCS". In this case, the service provision contract between the sender and his trusted third party indicates precisely whether each member uses, for outgoing mail (sending dematerialized documents), structured forms with essential information, and whether the service provider is responsible for the composition of the original documents, or just responsible for checking their legality or their conformity.

Generally, the letter is a mail based on an unstructured file. However, most large companies are currently organized according to professional rules, regulatory constraints, and new provisions of the laws concerning financial security, for exchanging, with their partners or regular counterparts, forms incorporating structured files and checks.

The composition and/or the verification of these forms are entrusted to a trusted correspondence third party who thus guarantees the legality and/or the conformity of the documents for both parties.

For the structured files, either the composition is done by the sender and, in this case, the trusted correspondence third party limits his service to checking the existence of the essential information, or the trusted third party intervenes as document composition service provider and, in this case, he merges the data received from the sender on the electronic form for which he is the depository; the result of his composition is first checked by the trusted third party and then validated by the sender in order to dispatch the document by all means and archive the proofs of this correspondence.

The concept of security checks relates to the remote identification of the parties and the integrity of the data communicated.

In addition to the examinations (essential information, partners file, addresses or final destinations of the document) to be made concerning the very nature of the computer file from which the original document is established, the trusted third party must "remotely check" the identity of this sender by authenticating his electronic signature. He must also check the integrity of his message. He must finally authenticate the recipient and check that he has indeed signed a prior agreement for secure electronic correspondence with his counterpart via the RCS network (membership to the secure correspondence network).

The delivery of the dematerialized mail to the recipient presupposes in fact that both parties have already defined and agreed in advance on the modalities for "reception" of the electronic documents: the electronic "mailbox" hosted and kept by a trusted third party in his "data center" is the best solution in terms of security. With no "mailbox" hosted and secured by a trusted third party, the proof of receipt cannot be easily or instantaneously established. Also, any correspondence anomalies may not be detected, notified and corrected effectively.

The digitalization of the documents relies by definition on reducing the risks of dispute and recourse to the courts; disputing the validity of a document and of a dematerialized correspondence ruins the trust chain and its service provider.

The digitalization is organized preventively by checking that the entire management and signing process "contains" no security holes. In case of malfunction, there is also provided a system for detecting anomalies, and for each of them, there is provided an instantaneous correction device which is implemented in the same "data center". In other words, the correction device is not subject to any external authority in order to avoid suspensions and delays that are incompatible with the security that should protect the sequencing of the electronic transactions.

The security and legality check is therefore applied not only to the content of the message with its essential information, but also the container. The check also relates to the electronic correspondence envelope from which the trusted third party will authenticate the identity of the sender, who sends, and of the recipient, who receives or acknowledges receipt.

The secure electronic address for receiving mail or for acknowledging receipt must be an official address, that is to say, an address checked and registered by a neutral trusted third party. Each address is registered in the membership contract for the sender and declared for the recipient in the partners file which initiates, by invitations, the registration of the declared counterparts.

The partners file is kept by the neutral trusted third party as specified by the current regulations.

Without this legality check on the identity of the people, their correspondence address, their signature and the structured content of their messages (mail document and receipt notification document or reply slip), the probative value of each electronic document cannot be established with certainty and archiving without legality check exposes the parties to disputes on the day of its restoration.

Prior adherence to the secure correspondence network "RCS" presupposes putting in place a correspondence agreement with probative value. In practice the correspondence of letters or hybrid mail (paper and ".pdf" image), and of totally "dematerialized" documents relies on the principle of a "correspondence agreement".

The organized exchange agreement is based on the need to obtain, at first sight, the membership of the counterparts or of its regular or professional correspondents. This adherence to the secure exchange and correspondence rules is often related to a community standard (EDI, XML, etc.) and to the practices established by the trusted correspondence third party.

It is thus established that the mail correspondence with probative value is based on a need to include each counterpart or recipient in his "partners file" and obtain his consent to the established exchange rules. These arrangements take priority before beginning any transaction of correspondence.

Any company or individual addressing mail to a new counterpart, that is to say, a person who has not yet subscribed to the adherence contract (secure correspondence network), usually has recourse to the trusted services of his correspondence third party to submit or propose this adherence contract to the "new recipient".

In this way, the two parties accept identical or symmetrical exchange rules with the same trusted third party.

The two parties benefit from the same rights and advantages for administering the proofs of electronic correspondence: each proof confirmed by the trusted correspondence third parties is established and conserved symmetrically and bilaterally. Also, the duly registered proof is time-stamped and sequestered with a bailiff so as to be answerable to the third party.

The legality check on the correspondence file and the adherence contract between the parties to an electronic mail are fundamental elements for establishing the probative value of a "dematerialized" document, in other words, without recourse to "material proofs".

To facilitate the mutual legality and adherence checks, recourse to the trusted correspondence third party is practical because said trusted correspondence third party is organized to perform these procedures and these checks to the benefit of both parties.

With regard to insurance companies, this security and operational risk reduction model is designed to limit risk premiums.

In as much as the rights of the people, their signatures and the file structures may change at any time, recourse to the trusted third party is practical because said trusted third party undertakes to "control" these changes.

The procedure specifications for the electronic documents with probative value (recorded or registered letters) deals in succession with each of the digitalization constraints in the order of the factors implemented to guarantee the legality and security throughout the "correspondence chain":
preparation-composition: identification and structured file,
transmission-reception: certification and identification, and
archiving-restoration: validation and conservation.

The contract of adherence to the "dematerialized correspondence" agreement comprises:
the personal registration,
the identification,
the personal attributes,
the composition of the documents,
the correspondence models,
the electronic signature,
the partners file,
the secure services partners (trusted third parties, correspondence third parties, archiving third parties), and
the partner invitation.

With respect to the dematerialized correspondence procedure, this comprises:
the initial transmittal,
the original: creation of the document,
the legal deposition, archiving: electronic safe ("CFE"),
message switching: two correspondence current accounts ("CCC"),
the notification to the recipient,
the receipt acknowledgement ("AR"),
the original of the receipt acknowledgement,
the archiving of the receipt acknowledgement,
the delivery of the receipt acknowledgement to the correspondence current account,
the information to the sender,
consultation and downloading,
the failure procedure: hybrid document alternative,
the mail types: registered or recorded document, and
the matching: electronic registered folder.

Each company or individual registers with the secure correspondence network "RCS", with his civil status, his telephone details and his Internet address.

The trusted third party keeps the directory of its members who are thus in a closed and secure community.

With regard to remote identification, the registration and storage of the personal identities incorporate, if necessary, those of the users or employees to whom certain correspondence functions are entrusted.

The authorizations are not transferable for preparing the data, validating the document, transmitting, receiving, reading or accessing, and downloading.

The personal attributes are the discriminating characters generally used to establish the civil status and to quality the registered person: identification of the company ("Kbis"), identity card, bank, tax or social identifier are the proofs most often used.

However, for a registered company, it is also the individual and social function that should be specified: general manager, authorized representative, administrator, executive director. The representative of the company who registers with the secure correspondence network "RCS" to use a correspondence current account, is qualified as "application administrator" and, in this respect, he may give authorizations for the correspondence functions. All these characters, deposited with the trusted third party to identify the people and then remotely authenticate them, are called "trust attributes".

The trust attributes are deposited with the trusted third party to enable him to identify the person remotely from his certificate or his secret code. These two identification "objects" in fact bear certain attributes for establishing the link between the people and their rights in the correspondence and correspondence current account management application.

Also associated with the attributes are certain personal correspondence objects such as the forms with their particular management procedures.

With regard to the composition of the documents, if it is data which is received by the trusted third party, this means that the member has previously decided with his service provider to entrust to him the composition of the document on the basis of a structured file, the model of which has already been deposited with him.

In any case, the trusted third party performs the legality and conformity check by checking the identity of the sender, the integrity of the data received, the existence of the recipient in his partner file (existing member with details without anomalies) and he checks that all the essential information exists in the document.

The composition of the document entails merging the data on the corresponding "deposited model", by incorporating therein, if necessary, a bar code and the "rating" of each partner who has a correspondence current account.

The identity "rating" is a security index which indicates the value or the quality of the registration of each person or holder of a correspondence current account. The rating of the identity of each of the parties makes it possible to warn each party of any risks that might exist concerning the identity of the counterpart, notably if the registration procedure is in progress or if the rejection of an ordinary or registered postal mail compromises the accuracy of the domicile or of the administration domiciliation.

In as much as the trusted third party deals with hybrid and dematerialized correspondence, he may detect a certain number of anomalies which vary the rating of the personal identity, which is called "dynamic identity" ("IDD").

With regard to the correspondence models, each member may deposit his document models. These are generally contractual documents that follow a formalism with professional rules, essential or complementary information, and consistency checks.

For each form, it is possible for the member to designate the people responsible for transferring the data, to validate the composition of the document, and to order its transmission with a signature.

The trusted third party may also receive documents that are "ready to dispatch", and in this case his role will be limited to checking the existence of the identities/numbers/correspondence accounts of the parties before dispatching.

In some cases, if the original documents communicated by the sender are intended to be archived long term with the "archiving" trusted third party, this service provider undertakes to repeat the legality check and the conformity tests on the basis defined in the dematerialized correspondence agreement. Archiving null and void documents is thus avoided.

In other cases, the trusted third party acts as a separate document composition service provider and, generally, he intervenes on a model referring to a structured file for which he is responsible for completing all the essential information from data communicated by the sender.

The recorded or registered letters are usually documents that do not refer to a structured file. The legal and contractual constraints are these days leading senders to increasingly entrust to their trusted third party the job of structuring their mail or their dematerialized documents to avoid any subsequent dispute or legal action.

In any case, the companies who might not conform to the "digitalization" standards cannot take advantage of any conformity with respect to the financial security laws which require them to demonstrate that the operational risks in the administrative domain are well controlled.

Failing certification in this area, the companies therefore turn to certified trusted third party service providers ("TAJ", etc).

With regard to the electronic signature, each member has the choice of three signatures in order to be remotely authenticated and ensure the integrity of the document in the long term.

In as much as the trusted third party creates the document in his "data center" on the basis of data transmitted in total security, the integrity of the document created in the "data center" is not compromised. In practice, since the transmission transaction is done in the data center between two correspondence current accounts, there is no "delivery risk".

In addition, since the "traceability" of the exchanges is organized on a bilateral basis (two-party management, that is to say, with copy of the original document in the recipient's current account), any error or internal malfunction will be immediately detected and will be sorted out retroactively without difficulty. However, the "integrity of the original document" must be assured in the long term by the conservation by legal archiving referring to the standard, for example the AFNOR standards.

For the document created, transmitted and archived in the same "data center", the authentication of the sender from his signature is therefore an essential element. In this respect, in embodiments, a double authentication device is implemented for the signing of a document.

The sender is authenticated a first time by his password for accessing his correspondence current account "CCC" or for accessing what for him serves as correspondence office: on this interface, he can validate, sign and schedule the sending of his document. At this signature level, he may activate a second secret code in order to be authenticated and to authorize his trusted third party to encrypt the electronic document with his signature certificate which is qualified or secured. The authentication is thus reinforced.

The authentication with integrity check via a cell phone and the remote signature in a clean room (signature of the trusted third party) help to reinforce the authentication and the integrity in a context of complete mobility.

The signatures are, hereinbelow, listed in the order of their probative force:

For the personal electronic signature "SEP", the member has a personal authentication code ("PIN" code) and a secret code exclusively reserved for the qualified signature procedure which is used by the trusted third party to sign by proxy and therefore to encrypt the documents to be dispatched. In this way, the integrity of the original document is ensured for legal archiving. The member agreement provides this trusted service and specifies that all the signature operations are numbered, time-stamped and confirmed to the member. All the signature operations are also recorded in a signature log which is sequestered each day with a bailiff. Each dematerialized document transmission "session" is the subject of a "traceability" report which is incorporated in the correspondence current account and "matched" to the document itself. The "traceability" report for each original document contains all the number and time-stamp information regarding the authentication actions and the encryption actions by each time specifying the nature of the electronic signature used.

For the member electronic signature "SEA", the secure correspondence network distributes to the members who request it in their registration form, a private electronic signature certificate exclusively reserved for transactions of correspondence and archiving in the trusted third party network, and for the intermediate operations managed by the member partners. Each electronic certificate bears the personal attributes of the member or of the delegated people (trustees). These attributes have therefore been previously stored and validated by the trusted third party, based on the civil status declaration and on the receipt of the certified proofs conforming to the original by the holder of the correspondence current account. All the operations done with this "member certificate" are recorded and sequestered with the bailiff. The revocation or "suspension" list for a certificate is held by an isolated server in the same "data center", but its operation has been entrusted to an independent third party so that, in certain situations, the trusted third party is not in a situation of conflict of interest. The certificate can be remotely downloaded to be installed by the user on his workstation or on a USB (universal serial bus) key. Since the adherence procedure takes several days, the time it takes to gather together the parts of the folder, the adherence certificate cannot be delivered on the day of registration, but only after the date of delivery of the adherence certificate. For this reason, if the registered person does not already have a qualified public certificate as explained in the following paragraph, the person can sign his electronic registration only with the first signature called "personal electronic signature" ("SEP").

For the qualified electronic signature "SEQ", the member can purchase and use a qualified electronic signature certificate which is distributed "face to face" by a certification authority which issues certificates and which customizes them according to the personal attributes that have been submitted to it by the person himself or by the delegated trusted third party which is a "registration office". In this case, the member must indicate, in his adherence form, the existence of this certificate so as to notify the trusted third party of the procedures which require him for each signature used, to systematically consult the revocation list (certificate canceled or suspended) published by the certification authority.

The correspondence third party is the one that handles the electronic communications, and does so by "message switching" between the two secure correspondence current accounts, with routing options (delivery by post, email or secure electronic fax). For each transmission, the certification of the exchanges and the notification of the document to the recipient are services provided by the correspondence third party (verification of the validity of the signature certificates originating these exchanges).

The archiving third party first checks the legality of the document which is transmitted and, only then, the faithful and long-term archiving is done with the correspondence proofs. The archiving third party encrypts the document with his qualified signature to preserve the integrity of the original document, and does so in order to deposit it in the electronic safe of the member with a serial number and a time-stamp. It can then restore each document at the request of its owner.

The invitation of a partner can also be done spontaneously at the time of transmission of a document to a person not yet identified and registered. It appears in the directory of the "partner file" with the sender but, until now, no invitation procedure has been successfully completed. In this case, the invitation/adherence procedure is launched simultaneously, and the recipient will not be able to read his document until the registration formalities are finished. A few days may therefore pass without the document being able to be opened in the correspondence current account reserved for the use of the recipient. If no adherence has been registered within eight days, the electronic document is re-materialized by the trusted third party, put in an envelope, and routed by mail. However, the recipient, for whom the trace of the electronic document is kept in his temporary correspondence account, does not have access to this account until the adherence is sorted out.

If the recipient refuses the adherence invitation or fails to complete his folder within the times allotted (two to eight calendar days), the electronic document is re-materialized, that is to say, printed by the printing third party and sent by mail. The paper document is accompanied by an explanatory manual concerning the operation of the secure correspondence network and concerning the benefits of the correspondence current account reserved for his temporary use.

If his adherence is sorted out within, for example, thirty days, he keeps the benefit of conservation of the first electronic document sent to his correspondence current account. Beyond one month, if the registration formalities are not finished, it is considered that the procedure has failed and the temporary correspondence current account is closed.

The reception services, for all-electronic recorded or registered letters, comprise management of the "receipt acknowledgements", reading of the documents received, downloading, and short-term conservation, for example for one year.

The dispatch services include many options which relate to composition, transmission and legal archiving. The holder of the correspondence current account indicates whether the trusted third party is chosen as a structured or unstructured document service provider. In the former case, he therefore entrusts to him his forms with the management rules for his structured files (information, tags, validation and signature procedures). Otherwise, if the documents are already prepared, the trusted third party is responsible only for transmission and faithful and long-term conservation. If appropriate, the sender may ask the trusted third party to apply a legality and conformity check before dispatching and archiving.

The personal electronic signature is a simplified signature with a specific secret code. The signature begins with an authentication based on the combination of the "log in" name, the password and the "secret code" reserved for the encryption of the signed document. The encryption of the message is entrusted to the trusted third party who uses his own "qualified certificate" to perform this operation.

The holder of the correspondence account therefore agrees to give a proxy to the trusted third party only to encrypt his documents in order for their integrity to be assured in the data center, and for the requested archiving and restoration time. The confidential code implemented for the "remote signature" is a six-digit number. He can learn thereof in different ways:

his GSM cell phone number (by SMS),
his professional fax number, and
his postal address.

A secret code transmitted to activate the "personal signature" which is not "signaled" in reception within a limited time delay becomes inoperative. This time delay depends on the communication channel used. For example, this time delay is:

for the cell phone network: 5 minutes,
for fax: 10 minutes, and
for mail: 3 days.

In the event of failure, the procedure for choosing the electronic signature must be repeated. Beyond the maximum time limit, if the beneficiary of the secret code has not flagged correct reception via the chosen channel, the interface indicates to him that he must repeat the procedure concerning the choice of the communication media used to recommence transmission of the secret code.

A person who forgets his personal signature secret code may ask for a new secret code to be created for his personal signature by recalling the code of his pre-registration of the folder (example: 2005.12.18.21.32.Milou).

The second electronic signature is the "private certificate" distributed by the trusted third party: member electronic signature ("SEA"). This certificate is given only when the registration formalities are finished, that is to say, when the trusted third party has received the paper proof or proofs for the on-line registration. These proofs must all be certified conformal with the hand of the member. His signature will be checked by comparison with the "receipt acknowledgement" returned to him by mail. In fact, the "member electronic signature" "SEA" may be given to the holder of the correspondence current account as soon as he has received his member certificate "RCS" by email.

The third electronic signature may be chosen with a certificate distributed by a public certification authority ("AC"). This is the qualified electronic signature ("SEQ"). Either the person already has it on his workstation, or he asks the trusted third party to obtain one for him. This request cannot succeed until the adherence contract and the return of the proofs have been formally validated by the sending of confirmation of the adherence form. In the latter case, the folder for registering his civil status "instructed" by the trusted third party, will be delivered by him to the certification authority for the signature certificate registered in his name to be customized.

If the person already uses a qualified certificate on his workstation, it will indicate the name of the certification authority so that the trusted correspondence third party can systematically access it to check in his "revocation list" to see whether the certificate is still valid and active.

The adherence contract can be signed by the first signature called "personal electronic signature" ("SEP"). The adherence contract cannot yet be signed with the member electronic signature ("SEA") because it is available only after the "adherence certificate" has been obtained. As it happens, this certificate is sent only if all the parts of the folder have been gathered together and validated by the trusted third party, which takes a certain time for mail. No member electronic signature ("SEA") or qualified electronic signature may be requested without having a rating of the personal and adherence identity less than the "certified" qualification (level "3"). In certain conditions, the adherence contract may be signed by the third signature that has a "qualified certificate", that is, the one that is supplied by a certification authority ("AC"): only when this signature certificate is already installed on the user's workstation at the time of registration.

When the adherence contract is finally signed, it is stored in the new member's correspondence current account; it is the very first "incoming mail" exchange that the new member can open or access.

At this stage, the adherence contract is stored with the information or the rating: member recorded ("ADE"). This is the second remote identification level (level "2" rating).

The first identification level recognized by the trusted third party is the one that corresponds to pre-registration: only the restricted or limited civil status has been completed either by the information communicated by the inviting person (confirmed member), or completed by the new member in a preparatory phase.

The preparatory phase is the one specifying the civil status with approval of the adherence contract but without any specific mention and choice of an electronic signature. This level is qualified as "member declared" ("ADD"): level "1" which allows only for recorded letters or documents to be retrieved. There is no explicit receipt acknowledgement with an electronic signature, but the member has accepted the adherence contract.

He can subsequently continue the adherence procedure to raise his level or his identification rating. The adherence certificate is formalized and signed by the trusted third party only if the following final formalities are fully observed: the member is invited to send paper proofs of his "civil status": photocopies of the "Kbis" extract, identity card, passport, bank account details ("RIB") or crossed check. On the photocopy of his civil status, he will be asked to affix his handwritten signature by writing "certified conforming to the original", and with a mention of the date.

As soon as the evidentiary documents are received by post, the trusted third party checks that the latter conform to the declarations given in the electronic adherence contract. The trusted third party then checks that the signature affixed to the "received acknowledgement" slip for the registered letter sent by the trusted third party is perfectly identical to that certifying the conformity of the photocopies of his civil status.

If this check is positive, the trusted third party constitutes the electronic folder for the member by matching the paper documents (proofs of civil status) which will be scanned, with the existing electronic originals, namely the signed adherence document and the hybrid registered letter with its scanned receipt acknowledgement.

The electronic folder is archived in a safe and all the proofs of correspondence are also sequestered with a bailiff. At this stage, the trusted third party delivers an adherence certificate with the following mentions:

for a complete, error-free folder, "member certified" "ADC" level "3" and for an incomplete folder, "member recorded" "ADE" level "2".

Over a certain number of criteria specific to the trusted third party, it is possible to achieve a level "4" maximum rating. This rating is acknowledged automatically for the member who goes physically to the trusted third party's registration office: this is "face-to-face registration".

The qualification for level "4" is: "member certified plus" or "ADC+". The rating of the members appears systematically in each correspondence document to inform each counterpart (transparency). There is, for this purpose, a security area in each correspondence which specifies the references of the two signatures used ("SEP", "SEA", "SEQ") and the current rating of the two member parties.

The rating of the identity is one of the aspects of the present invention. Depending on the quality of the registration folder completed, a rating is assigned to the identity of the holder of the correspondence current account. This rating makes it possible to easily identify any anomalies that limit the certification of the trusted third party or that lead to certification with reservations.

Downloading of the member signature: as soon as the registration contract is validated and confirmed, the trusted third party invites the member to download the signature certificate ("SEA" or "SEQ") that he has requested and that has been reserved for him. Technically, this is a simple java (registered trade mark) applet that is compatible with most computer configurations on the market.

If certain information regarding the situation of the partner has changed, the trusted third party informs the inviting user and his partners file is automatically updated.

In principle, the digitalization relies on the services of a document service provider trusted third party, a secure electronic communications operator and an archiver of the correspondence proofs. Its services relate:

to the strong authentication of the parties to the correspondence, to the encryption or encrypted imprint of the document ("SHA1" or ".sig"), to the structured file with its necessary information, to the secure message switching, and to the legal archiving of the proofs ("1" to "4").

The sender sends his data flow by FTPS (secure communication protocol). In his capacity as member, he is known to the trusted third party. He has notably deposited or not deposited forms or structured files. He is authenticated by his login name and his password. If it is a server that sends the data flow, there is often a level 4 "server certificate".

The validation of the envelope, by the sender, for transmission requires a signature (secret code or certificate). The personal electronic signature "SEP" is sufficient for this kind of operation. The authentication of the sender is evident and the encryption can be applied on the platform in the "data center" with the trusted third party's qualified certificate.

The trusted third party then constructs a compressed file ("ZIP") containing the document, the signature and the certification. If the sender has no digital certificate, it is the trusted third party that encrypts by proxy. The signature of the trusted third party based on a strong authentication adds to the validated document an encryption with the qualified certificate of the trusted third party. The compressed file is deposited in the electronic safe of both parties. The legal deposition of the original of the document is time-stamped and linked to a legal archiving deposition number ("DL" number).

The message switching service implements the symmetrical correspondence current accounts "CCC" of both parties. The faithful copy or the duplicate of the original document is delivered to the correspondence current account. The envelope database is completed: envelope number and legal deposition number with time-stamp.

The format envelope, for example in "PDF" (registered trade mark) format, is placed in the sender's CCC and the sender is immediately informed thereof by notification (email, electronic fax or cell phone). The notification is a notarized, and therefore recorded, message, in email, electronic fax or short message (SMS) form. The sender can thus see that the envelope has indeed been sent.

The recipient is advised, for example by email, of the "delivery" of an envelope with his legal deposition number: in no circumstances can he read it without having given his receipt acknowledgement. It is specified to him that the document sent is a "dematerialized recorded" envelope/ document ("DSD") or a "dematerialized registered" envelope/document ("DRD"). The receipt acknowledgement is a separate document. This document is either a "reply slip" drawn up in the name of the recipient, or a more formalized document which uses the electronic signature to reinforce the "non-repudiation".

With the deposition number, the authorized person (recipient) connects to the interface. With his user name ("login") and his password, the recipient accesses his correspondence current account ("CCC"). In order to remove the registered document, he is asked for the legal deposition number ("DL"). The recipient uses his personal electronic signature to sign the "receipt acknowledgement".

His personal electronic signature includes a secret code to reinforce his remote authentication and to activate the encryption of the receipt acknowledgement based on the qualified certificate of his trusted third party (proxy). If the recipient has downloaded a member or qualified digital certificate (distributed by a certification authority), he can directly and globally sign his receipt acknowledgement by himself encrypting the message. Ultimately, the electronic signature encrypts the "receipt acknowledgement" document.

For a recipient who has just registered and who is not a very experienced computer user, the simplified electronic signature "SE" procedure is recommended: as personal signature SEP, the recipient uses his activation secret code. The activation allows for his strong authentication and entrusts to the trusted third party the encryption of the receipt acknowledgement (with a time-stamp). This simplified procedure is compared to the other two:
  for member signature, he gives his "private certificate" and encrypts the receipt acknowledgement himself,
  for qualified signature, he gives his "public certificate" and encrypts the receipt acknowledgment himself.

In all the signature solutions, the validity of the certificate employed is checked. So as to avoid a conflict of interest, the signature servers are entrusted to an independent third party. The trusted third party checks that the legal deposition number of the document sent included in the receipt acknowledgement is correct. The trusted third party then checks, for the signature (".Sig"), that the certificate used by the recipient to acknowledge receipt is indeed valid. If these two checks are positive, the trusted third party composes the original document for the receipt acknowledgement. It indicates, in the signature log for this original, the nature of the certificate used with a time-stamp. Each signature, by activating its electronic signature, receives a confirmation email with the references of the signature log.

The signature log comprises: envelope/document number, legal deposition/document number, legal deposition/receipt acknowledgement number, the two member numbers, and the two signature references with their time-stamp. The original of the "receipt acknowledgement" is archived in the electronic safe.

Following the archiving of the receipt acknowledgement coupon or slip, the duplicate or conformal copy, for example in ".pdf" format, is delivered to the correspondence current account. The two parties are notified by electronic mail or short message of the receipt acknowledgment slip in the CCC account. The authorized people can then access and download the receipt acknowledgement. The recipient can then read and download the original of the "registered document". In each correspondence current account, the registered document and the receipt acknowledgement are arranged side by side (latching, electronic folder management).

The traceability of the operations is transmitted and sequestered by a bailiff in two phases:
  document composition, archiving, correspondence current accounts, and
  composition of the receipt acknowledgement, archiving, correspondence current accounts.

If anomalies are identified by the trusted third party at the time of entry of the "received acknowledgement", these are notified to the recipient of the registered document (list of anomalies, time-stamp, bailiff sequestration with time-stamp).

If the recipient of the registered document has not completed his "receipt acknowledgement" slip within two to eight days, the trusted third party materializes it, through the intermediary of the printer third party, in the form of a paper document in an envelope and has this envelope transmitted by postal means to the recipient's physical address.

A hybrid registered document involves delivering the mail in paper format via post to the recipient. The recipient can access the content of the document after having signed the paper receipt acknowledgement slip.

He can then access the conformal or faithful copy in his correspondence account, provided that he indicates, over the interface, the number of the receipt acknowledgement slip that he has received. Otherwise, in chronology order, he can access all his incoming envelopes with the paper receipt acknowledgements that have been recovered by the trusted third party and scanned.

The matching is used to construct a registered folder by bringing together the paper and digital documents. As soon as the trusted third party has recovered the paper receipt acknowledgement slip signed by the recipient, the latter being delivered to him by post, he can scan it and pair it with the electronic document sent.

The trusted third party also scans the paper receipt acknowledgement slip, in order to store in both correspondence current accounts the handwritten signature of the recipient and the bar code that is associated with the registered letter.

By entering the receipt acknowledgement slip number, the sender and the recipient can open the files, for example in ".pdf" format, in the registered folder (the document and the receipt acknowledgement time-stamped by the postal service).

The difference between a "registered" and a "recorded" dematerialized document lies in the receipt acknowledgement. For a registered document, the trusted third party has a "receipt acknowledgement" "composed" by the recipient which is a separate mail.

The digitalization of the reply slip therefore observes the formalism of the digitalization process. There is a structured format to be completed on-line mentioning the legal deposition number and using one of the three electronic signatures. This document is legally archived in an electronic safe with a time-stamp and its own deposition number and the registered document cannot be read by the recipient until he has signed the receipt acknowledgement.

For a recorded letter, it is sufficient to simply authenticate the recipient at a time when he connects to his account to allow him to read the mail. There is no document to be completed to observe the legal formalism of the receipt of acknowledgement specific to "register" correspondence.

There is only a reply slip which is optional. The receipt acknowledgement proof is administered by producing only the information concerning the time-stamp at the moment of access by the recipient to his correspondence current account, like the time-stamp recording the opening of the file, for example in ".pdf" format, containing the "incoming" document.

All the steps of the adherence procedure are time-stamped:
  either at the level of the connection/communications with the trusted third party,
  or at the "composition", "switching" and "archiving" levels.

Each document has an envelope number, a legal deposition number and a receipt acknowledgement number. Each signature is logged on an appropriate audit track.

The electronic communications can be handled by cell phone, by electronic fax, by mail (hybrid mail) or by telephone (server or call center).

All the operations included in the dematerialized processing scheme for an adherence procedure, or else for a dematerialized correspondence (ordinary letter or registered letter with a receipt acknowledgement), are recorded and time-stamped to feed the general audit track ("PAG") sequestered day by day with a bailiff.

The message storage transactions in the correspondence current accounts are performed bilaterally with a serial number. The archiving transactions in the electronic safes are performed bilaterally with a legal deposition number. Each time-stamp is produced systematically by crossing two atomic clocks, including the Meudon clock.

For the time-stamp, the NTP (net time protocol) protocol is used to synchronize with the Meudon atomic clock.

In the internal network, the clocks of the servers are themselves synchronized with the clocks of the two gateways.

In the secure correspondence network adherence contract, each party is warned, and accepts, that the service will be interrupted from midnight minus thirty seconds to midnight plus thirty seconds to neutralize any edge effect between two dates, the synchronization tolerance here being considered to be equal to thirty seconds.

The invention claimed is:

1. A method for securing data transfers between users of a trusted third party network, said method comprising:
  a step of checking the identity of at least one recipient to whom a sender of a document wants to transmit said document through said trusted third party network,
  a step of transmission, over said trusted third party network, by the sender to at least one of the recipients whose identity has been checked, of said document by implementing a plurality of steps of processing of said document by at least a document processing server, said plurality of document processing steps being selected from a group consisting of composition, switching, copying, communication, and archiving,
  for said plurality of document processing steps performed by the at least one document processing server, a step of measuring, by a computer of the trusted third party network, a processing step probative value indicative of a trustworthiness of each said processing step actually applied to said document, the processing step probative value being based at least in part according to a result returned concerning the processing step operation actually applied to the document,
  a step of aggregating the processing step probative values of the plurality of steps of document processing in said transmission to provide a measurement of an overall document transmission probative value of said transmission of the document, and
  a step of associating, in memory, said overall document transmission probative value with an identifier of said transmission of said document.

2. The method of claim 1, wherein the processing step probative value measured is a function of the procedure for identifying the sender implemented by the at least one document processing server.

3. The method of claim 1, wherein the processing step probative value measured is a function of the type of electronic signature used by at least one user sending or receiving data.

4. The method of claim 1, wherein the processing step probative value measured is a function of the type of archiving of the data transmitted by the at least one document processing server.

5. The method of claim 1, wherein the processing step probative value measured is a function of the result of computer reads performed by the at least one document processing server.

6. The method of claim 1, further comprising a step of construction of an acknowledgement of receipt comprising an information item representative of the overall document transmission probative value, said acknowledgement of receipt being associated with said document during said association step.

7. The method of claim 1, further comprising a step of assignment of an estimated overall document transmission probative value to a future document transmission and a step of selection of the processing steps to be carried out during this transmission according to the estimated overall document transmission probative value allowed by said document processing.

8. A trusted third party network system for managing secure electronic correspondence comprising at least one application computer server handling a directory service for users of said system and a service for supplying said users with current correspondence accounts on said computer server, said trusted third party network system handling scheduling of operations for processing said electronic correspondence belonging to a group consisting of composition before sending, transmission of the composed correspondence, copying of the transmitted correspondence and archiving of the sent correspondence, wherein said system also provides a service for end-to-end validation of the operations scheduled by the application server, said validation operations comprising computing probative values of identification of the users connecting to the directory service and of results returned concerning the operations actually applied to each individual correspondence and an overall probative value of the secured electronic correspondence.

9. The trusted third party network system for managing secure electronic correspondence of claim 8, wherein the validation service handles at least one validation operation chosen from the group consisting of operations used to ensure traceability of the integrity of the electronic correspondence, verification of the conformity of the operations for processing to predefined procedures and assignment of a probative value score to each of the operations for processing.

10. The trusted third party network system of claim 9, wherein the probative value scores of a determined list of operations for processing, comprising at least one operation not involving the directory service, are aggregated by the validation operation in a probative value score for each correspondence.

* * * * *